(12) United States Patent
Griffin et al.

(10) Patent No.: US 9,100,064 B2
(45) Date of Patent: Aug. 4, 2015

(54) MOBILE WIRELESS COMMUNICATIONS DEVICE, METHOD AND SYSTEM USING MAGNETIC SENSOR AND ACTIVATED NFC CIRCUIT FOR ESTABLISHING COMMUNICATIONS BETWEEN MOBILE WIRELESS COMMUNICATIONS DEVICES

(75) Inventors: Jason T. Griffin, Kitchener (CA); Steven H. Fyke, Waterloo (CA); Sherryl Lee Lorraine Scott, Toronto (CA)

(73) Assignee: BlackBerry Limited, Waterloo, ON (CA)

( * ) Notice: Subject to any disclaimer, the term of this patent is extended or adjusted under 35 U.S.C. 154(b) by 433 days.

(21) Appl. No.: 12/565,853

(22) Filed: Sep. 24, 2009

(65) Prior Publication Data

US 2011/0070826 A1 Mar. 24, 2011

(51) Int. Cl.
| | |
|---|---|
| *H04B 5/00* | (2006.01) |
| *H04B 5/02* | (2006.01) |
| *H04M 1/725* | (2006.01) |

(52) U.S. Cl.
CPC .............. *H04B 5/02* (2013.01); *H04M 1/7253* (2013.01); *H04M 2250/02* (2013.01); *H04M 2250/04* (2013.01); *H04M 2250/12* (2013.01)

(58) Field of Classification Search
USPC .................. 455/41.1, 41.3, 41.2, 70; 709/203
See application file for complete search history.

(56) References Cited

U.S. PATENT DOCUMENTS

| | | | |
|---|---|---|---|
| 2004/0117442 A1* | 6/2004 | Thielen .......................... | 709/203 |
| 2004/0203381 A1* | 10/2004 | Cahn et al. .................... | 455/41.2 |
| 2005/0222961 A1 | 10/2005 | Staib et al. ..................... | 705/64 |
| 2006/0073819 A1 | 4/2006 | Lowles ......................... | 455/418 |
| 2006/0079180 A1 | 4/2006 | Sinivaara | |
| 2006/0148404 A1 | 7/2006 | Wakim ........................ | 455/41.2 |
| 2007/0095892 A1 | 5/2007 | Lyons et al. .................. | 235/379 |
| 2007/0124503 A1 | 5/2007 | Ramos et al. ................. | 709/248 |
| 2007/0156436 A1 | 7/2007 | Fisher et al. ..................... | 705/1 |
| 2007/0165863 A1 | 7/2007 | Moosavi ....................... | 380/283 |
| 2007/0176903 A1 | 8/2007 | Dahlin et al. ................. | 345/169 |
| 2007/0197261 A1 | 8/2007 | Humbel ........................ | 455/558 |
| 2007/0229256 A1 | 10/2007 | Seal et al. ..................... | 340/551 |
| 2007/0239981 A1* | 10/2007 | Lessing ......................... | 713/164 |
| 2007/0266131 A1 | 11/2007 | Mazur et al. .................. | 709/223 |
| 2008/0012706 A1 | 1/2008 | Mak-Fan et al. ........... | 340/568.1 |
| 2008/0191892 A1 | 8/2008 | Kirkup et al. ............. | 340/686.6 |
| 2008/0301567 A1 | 12/2008 | Martin et al. ................. | 715/751 |
| 2009/0009233 A1 | 1/2009 | Shah et al. .................... | 327/511 |

(Continued)

FOREIGN PATENT DOCUMENTS

| | | | |
|---|---|---|---|
| CN | 101099303 | 1/2008 | |
| EP | 1239630 | 9/2002 | .............. H04L 12/28 |

(Continued)

*Primary Examiner* — Hsin-Chun Liao
(74) *Attorney, Agent, or Firm* — Guntin & Gust, PLC; Andrew Gust

(57) ABSTRACT

A mobile wireless communications device includes a housing and a circuit board carried by the housing. Radio frequency (RF) circuitry and a processor are carried by the housing and operative with each other. A Near Field Communications (NFC) circuit is connected to the processor for communicating using an NFC communications protocol. A magnetic sensor is supported by the housing and connected to the processor for sensing a magnetic field and generating a signal to the processor and in response, the processor activating the NFC circuit for transmitting or receiving data using the NFC communications protocol.

18 Claims, 21 Drawing Sheets

(56) References Cited

U.S. PATENT DOCUMENTS

| | | | |
|---|---|---|---|
| 2009/0104875 A1 | 4/2009 | Naniyat | ................ 455/41.3 |
| 2011/0070825 A1 | 3/2011 | Griffin et al. | |
| 2011/0070827 A1 | 3/2011 | Griffin et al. | |
| 2011/0070828 A1 | 3/2011 | Griffin et al. | |
| 2011/0070829 A1 | 3/2011 | Griffin et al. | |
| 2011/0070834 A1 | 3/2011 | Griffin et al. | |
| 2011/0070837 A1 | 3/2011 | Griffin et al. | |

FOREIGN PATENT DOCUMENTS

| | | | |
|---|---|---|---|
| GB | 2422517 | 7/2006 | ................ H02J 7/00 |
| WO | WO 2006040651 | 4/2006 | ................ G06K 7/00 |
| WO | WO 2006061713 | 6/2006 | ................ G06F 17/30 |
| WO | WO 2006109032 | 10/2006 | ................ H04L 12/56 |
| WO | 2007/112787 | 11/2007 | ................ H04B 5/02 |
| WO | WO 2008059460 | 5/2008 | ................ H04B 5/00 |
| WO | 2009105115 | 8/2009 | |

* cited by examiner

MOBILE WIRELESS COMMUNICATIONS DEVICE, METHOD AND SYSTEM USING MAGNETIC SENSOR AND ACTIVATED NFC CIRCUIT FOR ESTABLISHING COMMUNICATIONS BETWEEN MOBILE WIRELESS COMMUNICATIONS DEVICES

TECHNICAL FIELD

This application relates to the field of communications, and more particularly, to mobile wireless communications devices and related methods that use Near Field Communications (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow users to send and receive electronic mail (email) messages wirelessly and access the internet via a cellular network and/or a wireless local area network (WLAN), for example.

Some mobile devices incorporate contactless card technology and/or Near Field Communication chips. Near Field Communications technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

As Near Field Communication (NFC) technology becomes more commonplace, it is often used with portable wireless communications devices in association with other short-range wireless communications such as a wireless Bluetooth connection. For example, an NFC connection is often used to establish a wireless Bluetooth connection in which data for establishing the Bluetooth connection is communicated.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Figure 1:
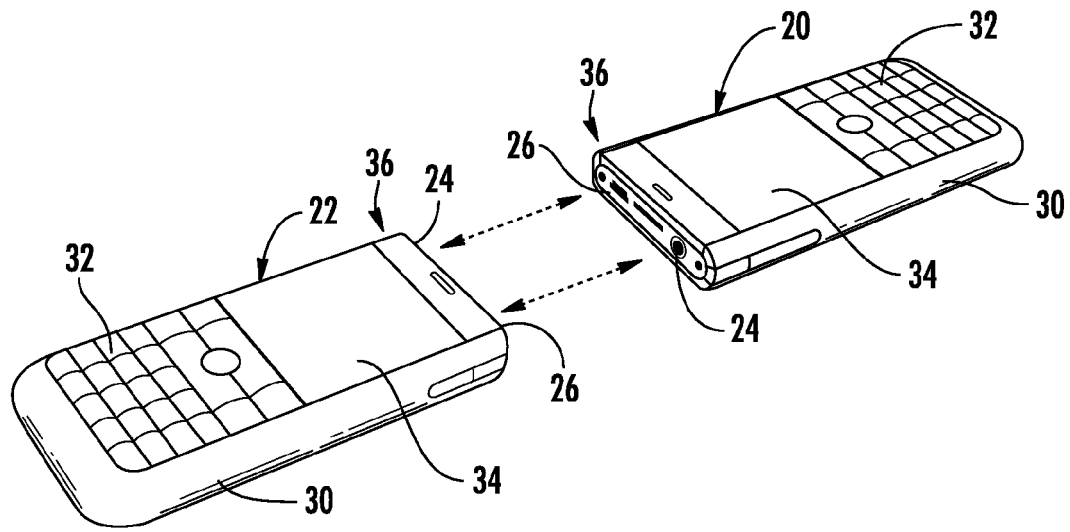
FIGS. 1-7 show an example of first and second mobile wireless communications devices in accordance with a non-limiting example in a device-to-device communication and showing the establishment of communications by sensing a magnet using a Hall Effect sensor, for example, to activate the Near Field Communications circuits and establish a higher-level communication protocol such as a Bluetooth wireless connection in accordance with a non-limiting aspect.

Different embodiments will now be described more fully hereinafter with reference to the accompanying drawings, in which various embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A drawback of some devices and systems that incorporate NFC and/or Bluetooth circuits is a requirement that the NFC and/or Bluetooth circuits are constantly on. This creates a power-draining circuit. Furthermore, in some cases could, this result in unwanted connections.

A communications device establishes wireless communications between communications devices and a device-to-device communication in one non-limiting example. Respective magnets and magnetic sensors are aligned and each are located on first and second communications devices such that a magnet on the first communications device is aligned with a magnetic sensor on the second communications device and a magnet on the second communications device is aligned with the magnetic sensor on the first communications device. A Near Field Communications (NFC) circuit contained in each of the first and second communications devices and at least one is activated in response to sensing the magnet on the respective other communications device. Data is exchanged between the first and second communications devices using a NFC communications protocol.

In accordance with another aspect, the two communications devices are in physical contact for activating the NFC circuits within respective communications devices. In another aspect, the two communications devices are within a few millimeters for activating the NFC circuits within respective communications devices. In another example, a wireless communications connection is established different than NFC between first and second communications devices based on data exchanged between first and second communications devices.

A personal identification number (PIN) and security key are exchanged between first and second communications devices using NFC for establishing a wireless communications connection in another non-limiting aspect. A wireless communications connection can be established using Bluetooth communications protocol or WiFi communications protocol.

In another aspect, the magnetic sensor uses the Hall Effect sensor located within a respective communications device. A processor can sense voltage variations produced by the Hall Effect to determine that the NFC circuit should be activated.

A communications device includes a housing and a circuit board carried by the housing. Radio frequency (RF) circuitry and a processor are carried by the housing, such as on a circuit board, and operative with each other. A Near Field Communications (NFC) circuit is positioned on the circuit board and connected to the processor for communicating using a NFC communications protocol. A magnetic sensor, such as a Hall Effect sensor, is supported by the housing and connected to the processor for sensing a magnetic field and generating a signal to the processor, and in response, the processor activating the NFC circuit for transmitting or receiving data using NFC communications protocol.

Other method aspects are set forth.

FIG. 1 shows an example of two similar portable wireless communications devices 20,22 that are brought together in a "gesture" as a physical movement towards each other into very close or actual physical contact to provide a simple interface and initiate a wireless connection. This physical gesture of moving a device into contact with the other device provides a more simple and lower-powered system and method of establishing a wireless connection, such as triggering the Hall Effect, which triggers the Near Field Communication (NFC), which could trigger a Bluetooth or WiFi wireless connection. In one non-limiting example, each device 20,22 is provided with a magnet 24 and an environment sensor 26 such as a Hall Effect sensor. Each is matched in a single touch or gesture, also termed a "kiss" gesture because the two devices 20,22 typically touch or "kiss" each other or are very close and in adjacent proximity. An example could be in the range of about less than 10 or 20 mm, depending on the strength of the magnets, and in one example, when it is about 7 mm or less from the tag or device. The sensor 26 on each device is aligned to the magnet on the respective other device, as illustrated in FIG. 1. One device senses ("sees") the other magnet via the Hall Effect, and a signal or voltage variation from the sensor is transmitted to a processor, which activates a Near Field Communication (NFC) circuit and communicates using the NFC communication protocol with the other device. The devices can then read data from each other using NFC. Communications protocol data for a wireless connection, such as the Bluetooth connection can be obtained based on data received using the NFC connection. For example, PIN numbers and security keys could be exchanged using NFC to establish a Bluetooth connection.

As will be explained in detail below, it is possible for one communications device 20 to establish communication with a passive peripheral by touching the device to a passive magnetic tag (NEC tag in this example), thus initiating a NEC connection with the peripheral. Passive magnetic tag could refer to different devices, including NEC tags or business cardholders or other data storage devices with limited transmit capability. If the tag is blank (for example, a business cardholder), the tag can be programmed in some cases. If the tag is already programmed, the communications device can read information from the tag, which may lead to further action. For example, if the tag is associated with a printer, the communications device can run a print job on the printer, as discussed further below. An advantage of such system is the Hall Effect is entirely passive, which avoids the requirement for the mobile wireless communications device to have the NEC or Bluetooth circuit constantly "on" and thus drawing power. Only when the communications device 20 determines ("sees") the presence of another magnet such as on another communications device 22 or passive tag, the device 20 will trigger the initiation of a wireless NEC or Bluetooth connection. An additional benefit is that the Hall Effect requires a closer contact than the NFC circuit, meaning that a deliberate "gesture" is required, such as touching the two communications devices together. This avoids accidental or invasive connections when other Bluetooth-enabled devices are in the area. The term tag as used above can include various devices, which typically operate passively instead of operating in an active mode as with the communications devices 20,22.

As illustrated, each communications device 20,22 in this example for a device-to-device communication as shown in FIGS. 1-7 includes a housing 30, keyboard 32, and display 34, which could operate as a touch display in one example. As noted above, each device includes a magnetic sensor 26, for example, a Hall Effect sensor in this non-limiting example and a magnet 24. The sensor 26 and magnet 24 work together to activate any NFC circuits in each device for exchanging data.

Near Field Communication (NFC) technology is an extension of the ISO 14443 proximity-card standard as a contactless card, RFID standard that incorporates the interface of a smart card and a reader into one device. A NFC device such as a mobile phone or other mobile wireless communications device typically includes an NFC integrated circuit (IC) chip that communicates to such devices as existing ISO 14443 smart cards and readers and other NFC devices and compatible with any existing contactless infrastructure. The NFC IC chips use magnetic field induction where two loop antennas are located near each other and form an air-core transformer. The technology operates on the unlicensed radio frequency ISM band of about 13.56 MHz and has a bandwidth of about 2 MHz. The working distance is usually about 0 to 20 centimeters. A user of the NFC device brings one NFC enabled device close to another NFC enabled device or tag to initiate NFC communication, with data rates ranging from 106 to about 424 kbit/s.

There are different modes of operation. Most mobile wireless communications devices operate in an active communications mode using a modified Miller and 100% amplitude shift keyed (ASK) code unless a passive mode is used in which a Manchester and ASK code is used. Further details are set forth in the Mobile NFC Technical Guidelines, Version 2.0, November 2007 by GSMA, the disclosure of which is hereby incorporated by reference in its entirety.

The "Near Field Communications Interface and Protocol" or "NFCIP-1" or "the NFC protocol" also allows for communication between an initiator device and a target device, when the initiator device and the target device are brought close together. In the example above, the communications device 20 can be an initiator and a printer or business cardholder could be the target device, and operate as a passive device. Magnets could be sensed using the sensor 26 and the NFC circuit in device 20 activated. Detailed information about NFCIP-1 is available in a published standard called ECMA-340, which is available from Ecma International at www.ecma-international.org.

The NFC protocol operates within the globally available and unregulated radio frequency band of 13.56 MHz and has a working distance of up to 20 centimeters. Three data rates are typically available: 106 kilobits per second (kbit/s), 212 kbit/s, and 424 kbit/s. As noted before, multiple modes of communication are currently available. In the passive communication mode, the initiator device provides an electromagnetic carrier field and the target device answers the initiator device by modulating the carrier field. In the passive communication mode, the target device may draw operating power from the carrier field provided by the initiator device. Advantageously, only the initiator device is required to have a power supply. The modulating magnetic field created by the target device could be used for communicating a limited amount of data.

In the active communication mode, both the initiator device and the target device generate their own electromagnetic field, such as in the example using the communications devices 20,22. The initiator device starts the NFCIP-1 communication. The target device can respond to a command received from the initiator device in the active communication mode by modulating the electromagnetic field generated by the target device. Typically, in the active communication mode, both devices require a power supply.

Notably, in the active communication mode, both devices can act as either initiator or target, while this is not the case in the passive communication mode, wherein the device without the ability to create an electromagnetic carrier field cannot be an initiator device and instead becomes the target device.

According to NFCIP-1, responsive to sensing modulation of the initiator electromagnetic carrier field by the target device, the initiator device performs an initial collision avoidance sequence by transmitting an ATR_REQ (attribute request) command to the target device. Responsive to receiving the ATR_REQ (attribute request) command, the target device transmits a response called ATR_RES (attribute response).

Referring again to FIG. 1 and more particularly to the device-to-device sequence shown in FIGS. 1-7, the device-to-device communication allows a user of a portable wireless communications device 20 as illustrated to share media or data content with another communications device 22 in an easy and secure manner. Such media or data could include photographs, address book exchanges, instant messages, music or other audio, video, stored information such as related to a grocery store, tickets, movie theater data, or coupons, as non-limiting examples. This audio could include voice or personal sound recordings that one might make into ring tones, as an example.

Figure 2:
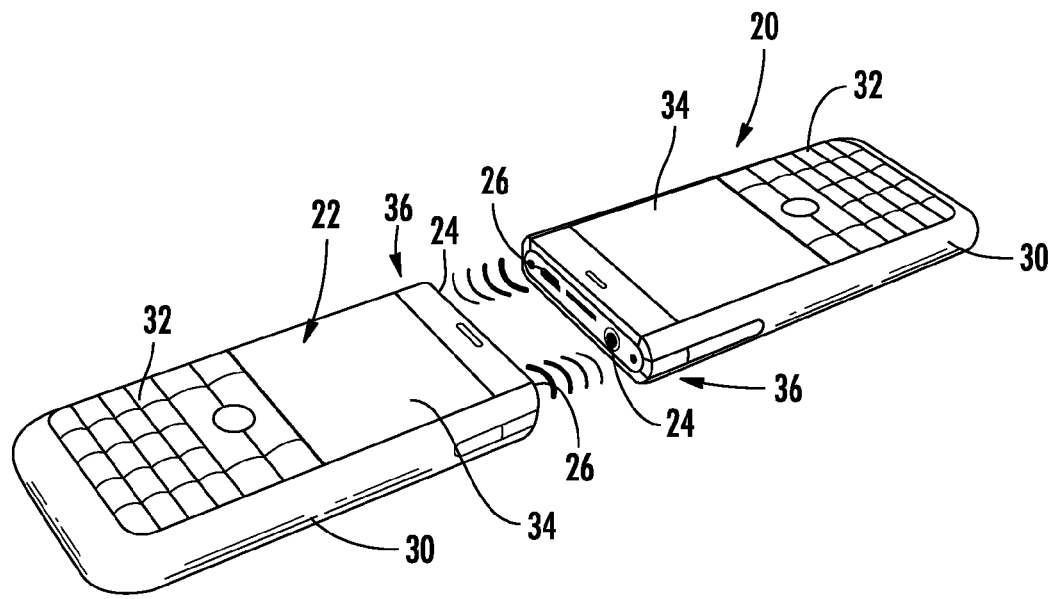

As shown in FIG. 1, each portable wireless communications device 20,22 includes a top or upper section 36 that supports the magnet 24 and magnetic sensor 26 and associated sensing circuitry embedded in the top of the device in one non-limiting example. As the two communications devices 20,22 approach each other (touch each other typically), their respective magnetic fields are detected through their magnetic sensors as Hall Effect sensors and associated circuitry and the Near Field Communication (NFC) circuit in each communications device are activated to allow subsequent and more complicated data exchange. It is possible to integrate the NFC/magnet into a skin/battery door of a device. For example, an older device will still broadcast a Bluetooth name/security code to another device, but a user would still have to enter their information manually. Without some type of communication between the NFC portion and the host processor, this function may be limited. If a skin is connected as a host via USB (or a slave if the USB-on-the-go is implemented) and the NFC is connected, it is possible to gain full function. In this example, however, it may require its own separate power supply. FIG. 2 shows both devices approaching each other and the respective magnetic fields from the aligned magnet and Hall Effect sensors in operation.

Figure 3:
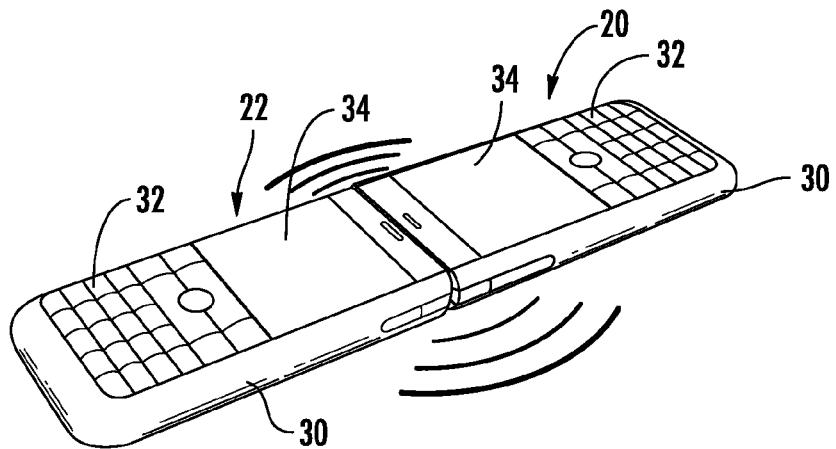
Figure 4:
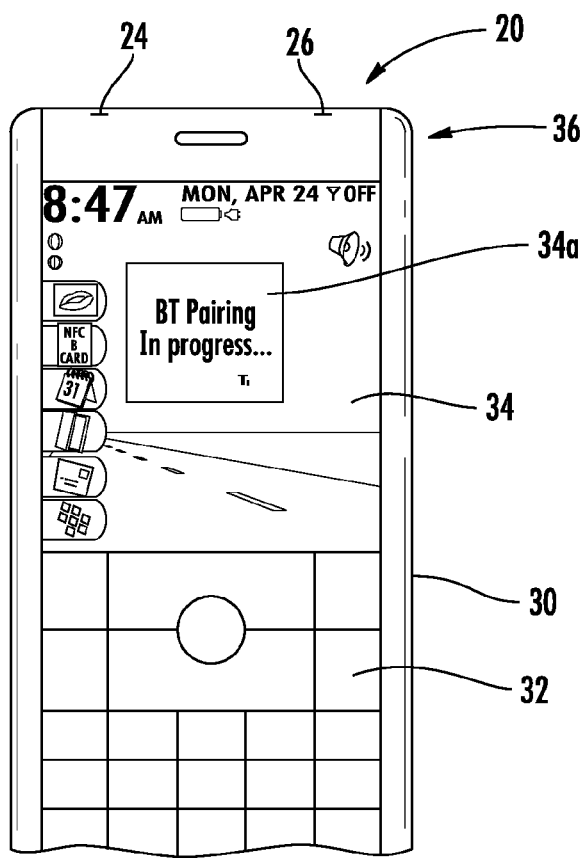
Figure 5:
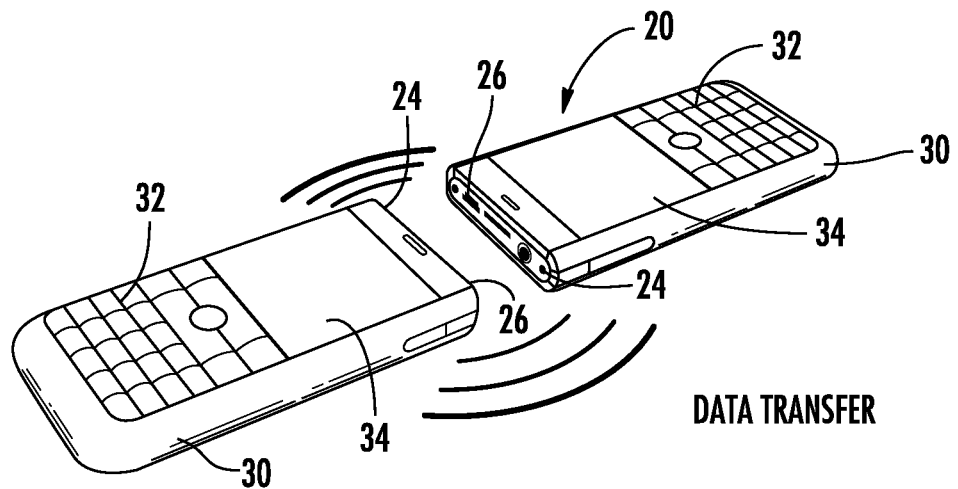
Figure 6:
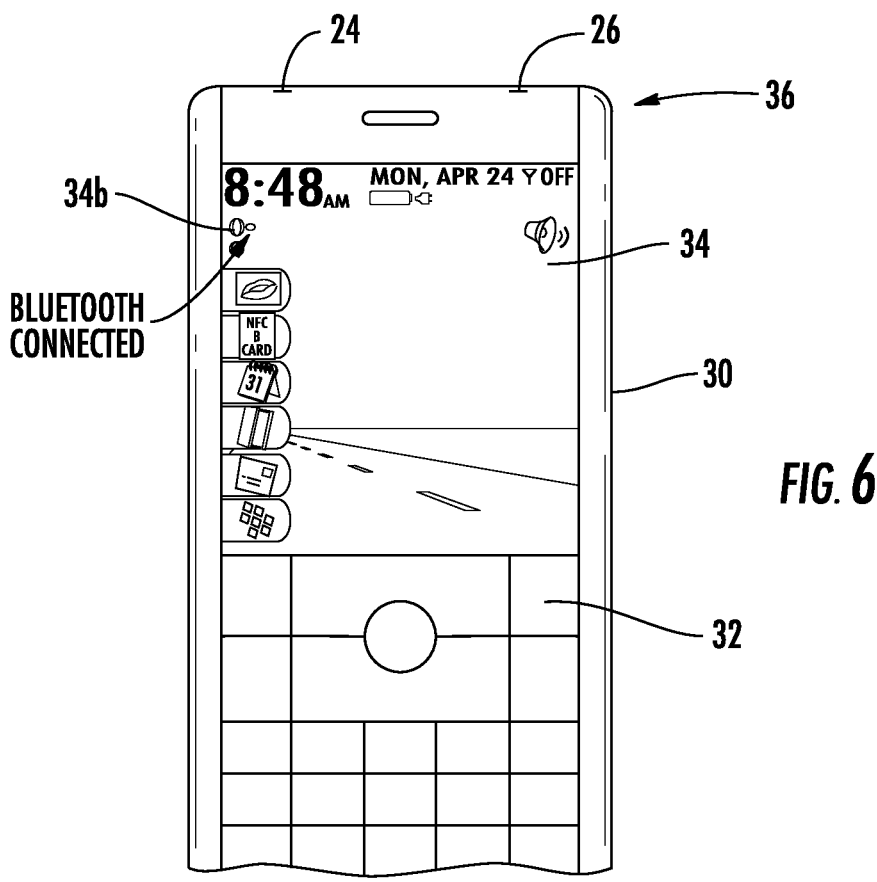
Figure 7:
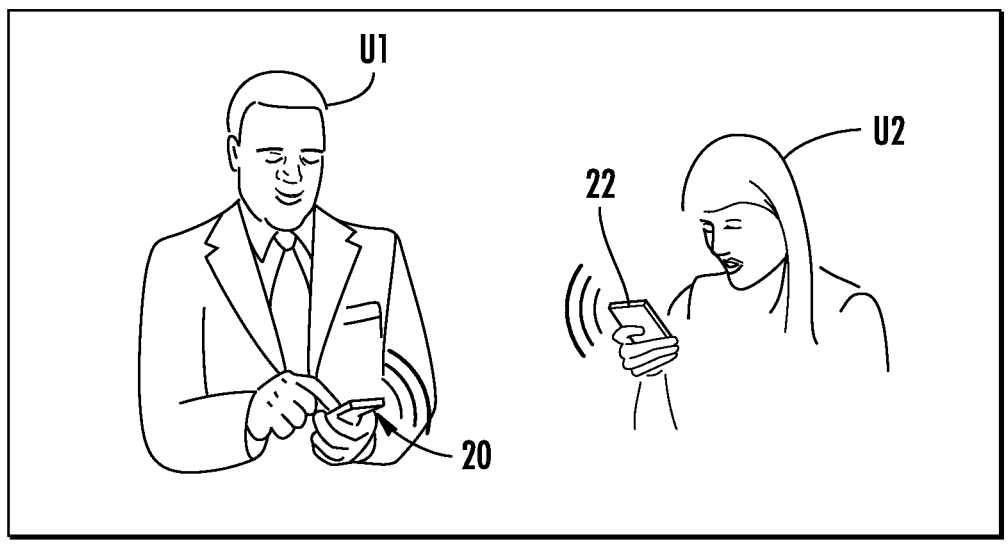

FIG. 3 shows both devices 20,22 touching each other in what is also called the "kiss" gesture, in which the Hall Effect sensors 26 are operable and aligned to activate the NFC circuits by touching the two devices together. As shown in FIG. 3, the NFC circuit is thus activated and data is exchanged between devices such as security codes, IDs or PINs to establish a higher level communications protocol between the two devices, such as initiating a Bluetooth wireless connection as shown in FIG. 4, in which a pop-up screen 34a on one or both of the displays of the communications devices states that BT (Bluetooth) pairing is in progress. Once the Bluetooth connection is established, the devices can be separated as shown in FIG. 5 and allow further data transfer of greater quantities using Bluetooth connections instead of the limited data transferred by NFC for initiating a Bluetooth connection. FIG. 6 shows that the display 34 on one of the devices has an indicator logo 34b indicating that the device is Bluetooth connected to the other device. As shown in FIG. 7 with the devices 20,22 now connected via a Bluetooth connection, the users (U1 and U2) are free to share their device content and transfer data or other content as desired, for example, exchange addresses, photographs, video or other information.

In operation, a Hall Effect sensor operates similar to a transducer that varies its output voltage in response to changes in magnetic field, and thus, acts as a passive sensor. This type of sensor can be used for proximity sensing when two devices are brought together, such as the devices 20,22 shown in FIG. 3. A magnetic field is produced in the circuit that varies with current. The Hall Effect sensor measures the current without interrupting the circuit. In one example, a sensor is integrated with a wound core or permanent magnet that surrounds a conductor to be measured, operating as a switch in a digital on/off mode. It is connected to an NFC circuit via a processor in the device to switch the NFC circuit on. For example, the processor in the wireless device could determine voltage variations indicative of the "kiss" gesture, i.e., devices touching, and thus send a signal to the NFC circuit activating that circuit.

Bluetooth, on the other hand, is an open wireless protocol that exchanges data over short distances (but longer than NFC) from fixed and mobile devices, creating what is essentially a Personal Area Network (PAN). A wireless Bluetooth connection typically communicates using a frequency-hopping spread spectrum signal and up to 79 different frequencies. In one modulation, it is a Gaussian Frequency-Shift Keying (GFSK) system that can achieve a gross data rate of up to 1 Mb/s. It is short range and is power-class-dependent of up to one meter, ten meters or 100 meters depending on the type of transceiver microchip used in communications devices. Typically, modern communications devices will allow Bluetooth communication of up to 100 meters in non-limiting examples.

A non-limiting example of various functional components that can be used in the exemplary mobile wireless communications device 20 is further described in the example below with reference to FIG. 8. New reference numerals are used. Device 100 is an example embodiment of devices 20,22. The device 100 illustratively includes a housing 120, a keypad 140 and an output device 160. The output device 160 shown may comprise a display, which may comprise a full graphic LCD and may be touch sensitive as an input device. Other types of output devices may alternatively be used. A processing device 180 is contained within the housing 120 and is coupled between the keypad 140 and the display 160. This device 180 is typically a microprocessor chip contained on a circuit board in the housing 120. If the display is a touch-activated display, the keypad 140 may not be necessary. The processing device 180 controls the operation of the display 160, as well as the overall operation of the mobile device 100, in response to actuation of keys on the keypad 140 by the user.

The housing 120 may be elongated vertically, or may take on other sizes and shapes (including clamshell housing structures). The keypad may include a mode selection key, or the device may include other hardware or software for switching between text entry and telephony entry.

Figure 8:
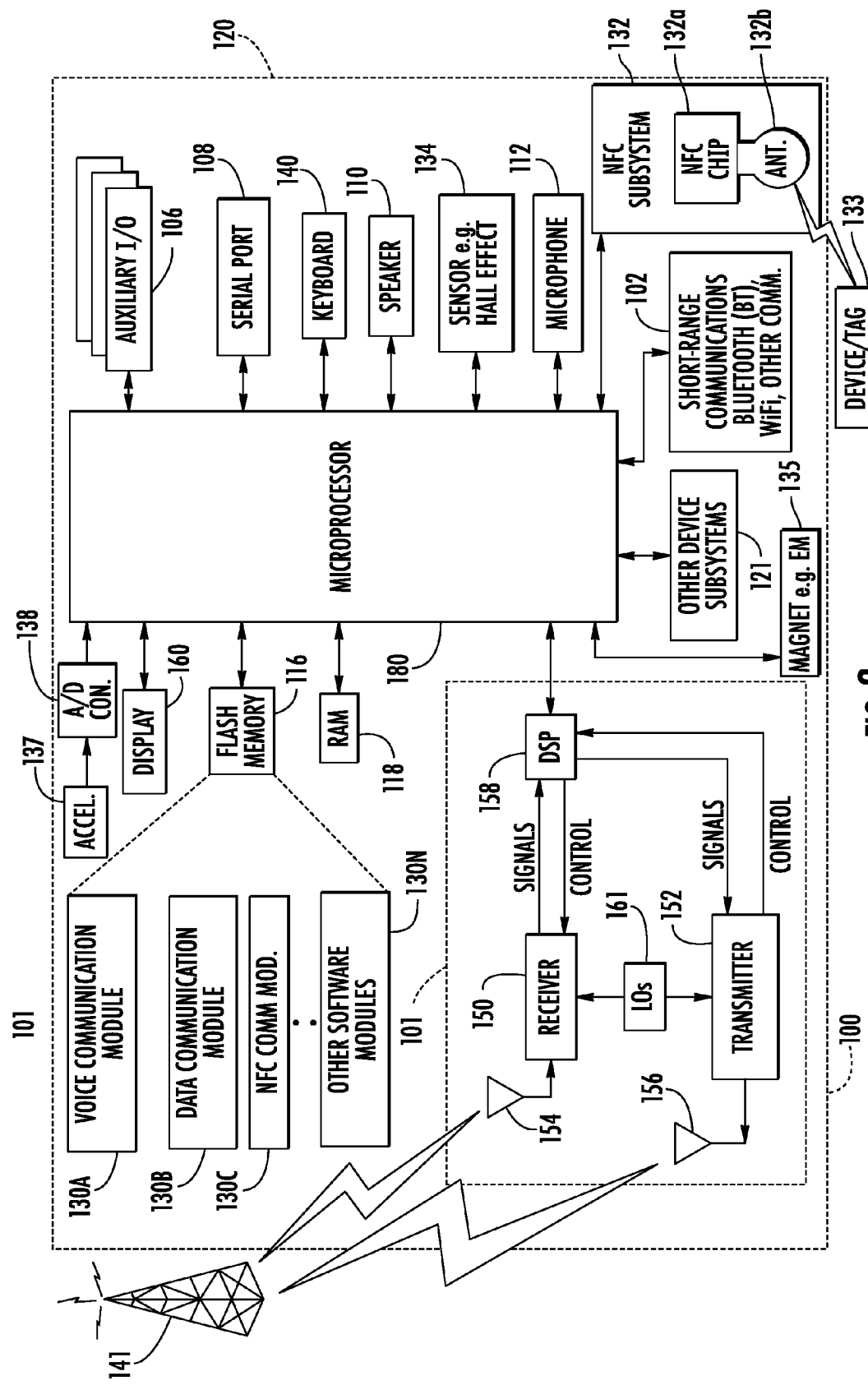
FIG. 8 is a high-level block diagram showing basic components of a portable wireless communications device that can incorporate the functionality for either device-to-device communication or a device-tag communication in accordance with a non-limiting aspect as shown in FIGS. 9-19.
Figure 9:
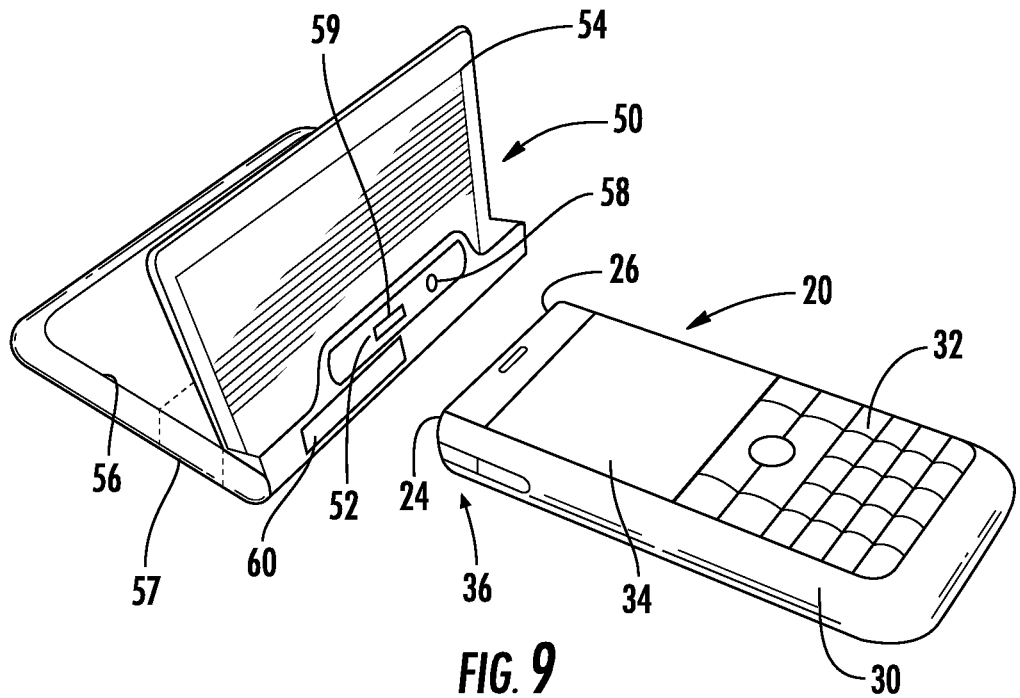
FIGS. 9-19 are examples of a device-tag communication and showing an example of a portable wireless communications device and NFC tag as a business cardholder using its magnet to activate a Near Field Communication circuit for data transfer.

In addition to the processing device 180, other parts of the mobile device 100 are shown schematically in FIG. 8. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 100 is in this example a two-way RF communications device having voice and data communications capabilities using RF circuitry. In addition, the mobile device 100 has the capability to communicate with other computer systems via the Internet. The short-range communications subsystem 102 includes a Bluetooth (BT) communications module for establishing a Bluetooth wireless connection and other communications modules such as an infrared module or device, WiFi circuit and module, and associated components and circuits as part of RF circuitry.

Operating system software executed by the processing device 180 may be stored in a persistent store, such as the flash memory 116, or may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130a-130n on the device 100. A predetermined set of applications that control basic device operations, such as data and voice communications 130a and 130b, may be installed on the device 100 during manufacture. A Near Field Communications module 130C is also installed as illustrated.

The NFC communications module 130c as a software module cooperates with the microprocessor 180 through the flash memory 116. The microprocessor 180 operates also with the NFC subsystem 132 that includes a NFC chip 132a and antenna 132b that communicates with another device/tag 133 such as the type shown in FIGS. 1-7. The NFC communications module 130c allows the microprocessor to control the NFC subsystem 132, which includes the NEC chip 132a and antenna 132b that is tuned typically for 13.56 MHz. The NFC chip 132a could be, for example, a PN531 microcontroller-based transmission module from the Phillips Semiconductor Branch of Koninklijke Phillips Electronics N.V. When the NEC chip is a PN531 module, the NEC chip 132a could include analog circuitry and a contact list Universal Asynchronous Receiver Transmitter (UART), a core and a set of host interfaces. The analog circuitry could include an output driver, an integrated demodulator, a bit decoder, a mode detector and an RF-level detector. The contact list UART could include elements for data processing, Cyclical Redundancy Checking (CFC), parity generation, framing generation and check bit coding and decoding. The core typically includes an 80C51 microcontroller, 32 Kbyte of ROM and one Kbyte of RAM. A set of host interfaces can interface with the microprocessor and interface according to such known standards as I2C, serial UART, SPI and USB.

There is also illustrated the magnetic sensor 134 that could be formed as a Hall Effect sensor and is connected to the microprocessor 180. It includes the various components that operate as a Hall Effect sensor, including any necessary coils or other circuits. There is also illustrated a magnet 135 that, in one example, is formed as an electromagnet and operates with the microprocessor to allow a different communications pathway using electromagnetic energy that is changed to correspond to changing data. The electromagnet 135 operates similar to the magnet 24 as shown in the mobile wireless communications device in FIGS. 1-7, but operates, in one example, to form another communications protocol pathway. This electromagnet 135 has different functions, including working as an active or passive device in association with other components of the device 100 as illustrated. For example, when the electromagnet 135 is used in place of an installed magnet (non-electromagnetic) in the devices of FIG. 1, a pulse of energy is delivered to the Hall Effect sensor in the other device. The other device receives the pulse and establishes a Bluetooth connection without going through activation of the NFC circuit. A WiFi connection, for example, in the alternative is established if a Bluetooth connection is not established. Other software modules 130n include software that interoperates with the magnetic sensor 134 and any magnet or electromagnet 135 or other magnetic circuitry that are included within the overall electromagnet 135.

An accelerometer 137 and an analog/digital converter 138 are connected to the microprocessor 180 as illustrated and allow another implementation of the NFC automatic tag detection (and automatic peer-to-peer detection). The accelerometer 137 recognizes the tapping of a communications device against a tag or another device, i.e., recognizes the vibrations. Instead of using the Hall effect sensors and magnets to wake up the NFC circuit, the circuit uses tap recognition, for example, as a vibration sensor and accelerometer in this example. It should be understood that when the device is tapped against another object, for example, an NFC tag, a profile is generated as a matter of certain accelerometer parameters being met or exceeded. If the profile is compared against a known tap profile, it will wake the NFC circuit and initiate communication. In other embodiments, the accelerometer could be part of a motion sensor system and other motion sensor systems other than an accelerometer could be used such as a cadence sensor or cadence detection system.

As will be appreciated by persons skilled in the art, an accelerometer is a sensor which converts acceleration from motion (e.g., movement of the communications device or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer is used: (1) an analog output requiring buffering and analog-to-digital (A/D) conversion; and (2) a digital output which is typically available in an industry standard interface such as an SPI (Serial Peripheral Interface) or I2C (Inter- Integrated Circuit) interface. The embodiment shown in FIG. 8 illustrates an analog output into the A/D converter 138. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers varies up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

The operational settings of the accelerometer, in one example, are controlled using control signals sent to the accelerometer via a serial interface. In one illustrated example, the microprocessor determines the motion detection in accordance with the acceleration measured by the accelerometer. Raw acceleration data measured by the accelerometer, in another example, is sent to the microprocessor via a serial interface where motion detection is determined by the operating system or other software module. In other embodiments, a different digital accelerometer configuration could be used, or a suitable analog accelerometer and control circuit could be used.

In addition, a personal information manager (PIM) application may be installed during manufacture. The PIM is capable of organizing and managing data items, such as email, calendar events, voice mails, appointments, and task items. The PIM application is also capable of sending and receiving data items via a wireless network 141. The PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem 120, which are part of RF circuitry contained on a circuit board typically as shown by the outline. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161 as part of RF circuitry in this example. The specific design and implementation of the communications subsystem 101 is dependent upon the communications network in which the mobile device 100 is intended to operate. For example, the mobile device 100 may include a communications subsystem 101 designed to operate with the Mobitex™, Data TACT™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be used with the mobile device 100.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically utilizes a subscriber identity module, commonly referred to as a SIM card, in order to operate on a GPRS network.

When required network registration or activation procedures have been completed, the mobile device 100 sends and receives communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a trackball, a trackpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 100. In addition, the display 160 may also be used in voice communications mode, for example to display the identity of a calling party, the duration of a voice call, or other voice call related information and whether there are NFC communications or a Bluetooth connection.

Any short-range communications subsystem enables communication between the mobile device 100 and other proximate systems or devices, which need not necessarily be similar devices. For example, the short-range communications subsystem may include an infrared device and associated circuits and components as described above, or a Bluetooth communications module to provide for communication with similarly-enabled systems and devices as well as the NFC communications.

In accordance with various embodiments, GSM is an exemplary communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing is usually used to allow about 8 speech channels per radio frequency channel, giving 8 radio time slots and 8 burst periods grouped into what is called a TDMA frame. For example, a channel data rate is typically about 270.833 Kbps and a frame duration of about 4.615 milliseconds (MS) in one non-limiting example. The power output usually varies from about 1 to about 2 watts.

Typically, linear predictive coding (LPC) is used to reduce the bit rate and provide parameters for a filter to mimic a vocal track with speech encoded at about 13 Kbps. Four different cell sizes are typically used in a GSM network, including macro, micro, pico and umbrella cells. A base station antenna is typically installed on a master building above the average rooftop level in a macrocell. In a microcell, the antenna height is typically under the average rooftop level and used in urban areas. Microcells typically have a diameter of about a few dozen meters and are used indoors. Umbrella cells usually cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identity module (SIM) is usually implemented in the communications device, for example, the well-known SIM card, similar to a smart card containing the subscription information and phone book of a user. The user typically switches handsets or could change operators by changing a SIM. USIM, RUIM or CSIM and other similar technologies can be used in UMTS or CDMA networks.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer typically oversees the radio and fixed link establishment between the mobile station and an MSE.

It is also possible to used Enhanced Data Rates for GSM Evolution (EDGE), as an enhancement to General Packet Radio Service (GPRS) networks. EDGE typically uses 8 Phase Shift Keying (8 PSK) and Gaussian Minimum Shift Keying (GMSK) for different modulation and coding schemes. A three-bit word is usually produced for every changing carrier phase. A rate adaptation algorithm typically adapts the Modulation and Coding Scheme (MCS) according to the quality of the radio channel and the bit rate and robustness of data transmission. Base stations are typically modified for EDGE use.

FIGS. 9-19 illustrate details when a communications device 20 such as shown in FIGS. 1-7 as a non-limiting example electronically transfers contact information such as with a compatible business cardholder 50 that operates as a passive device in this example, similar to a passive magnetic tag (or NFC tag) as described above. The business cardholder 50 as illustrated includes an interface 52 for contacting the device 20 at the rear and a hinged cover 54 and data entry point 56 where business cards can be scanned or information entered on a keypad as non-limiting examples. A processor circuit 57 provides general functions for operation of the business cardholder and its associated function, for example, NFC circuits, scan circuits or keyboards.

Figure 10:
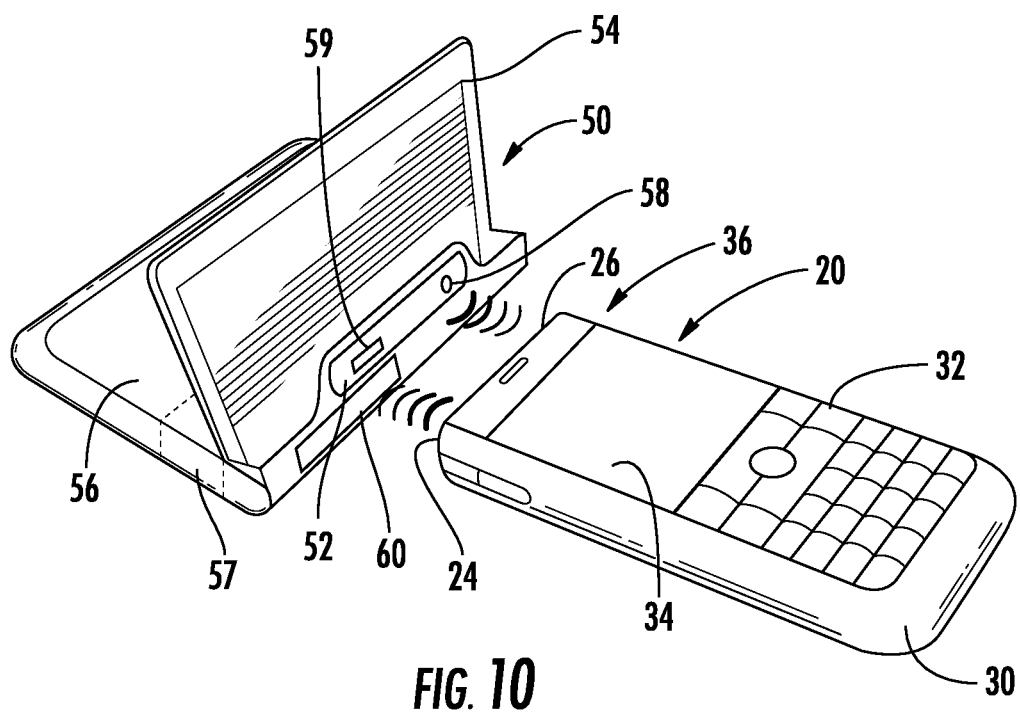
Figure 11:
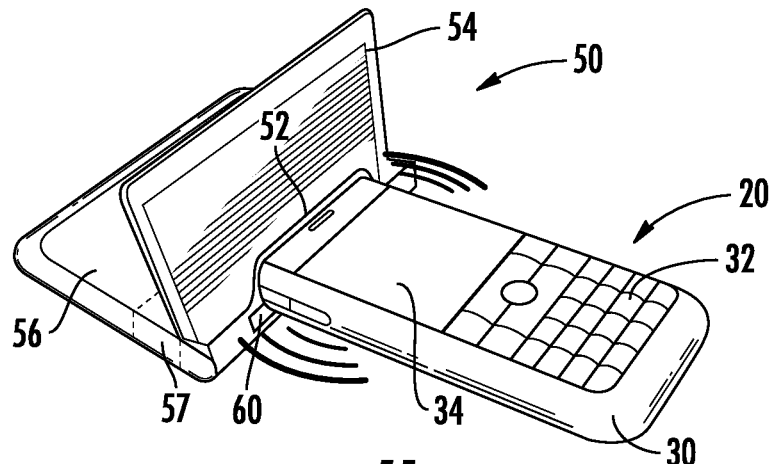

As shown in FIG. 10, at least one magnet 58 is embedded in the business cardholder and sensed by the Hall Effect sensor 26 (or other sensor) in the portable wireless communications device 20. A Hall Effect or other sensor 59 in this example is positioned at the interface 52. The Hall Effect sensor 26 senses a magnet 58 to activate the Near Field Communications (NFC) circuit (or subsystem 132) such as shown in FIG. 8 in a non-limiting example. In one aspect, a passive NFC tag 60 is embedded in the cardholder and is read by the device 20. In this example, the device 20 determines that the tag is blank as shown in FIG. 11 in which the Near Field Communications has been established for transferring and exchanging limited amounts of data as compared to a Bluetooth connection.

Figure 12:
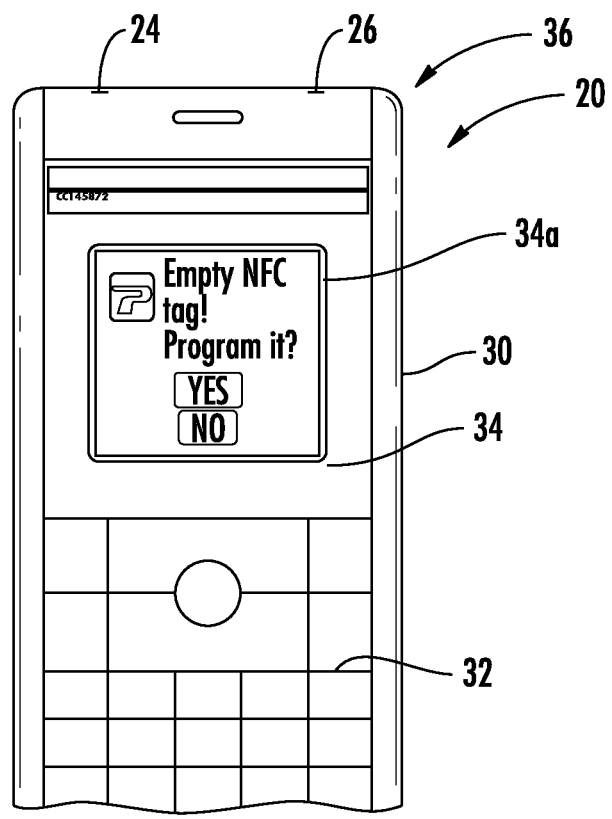
Figure 13:
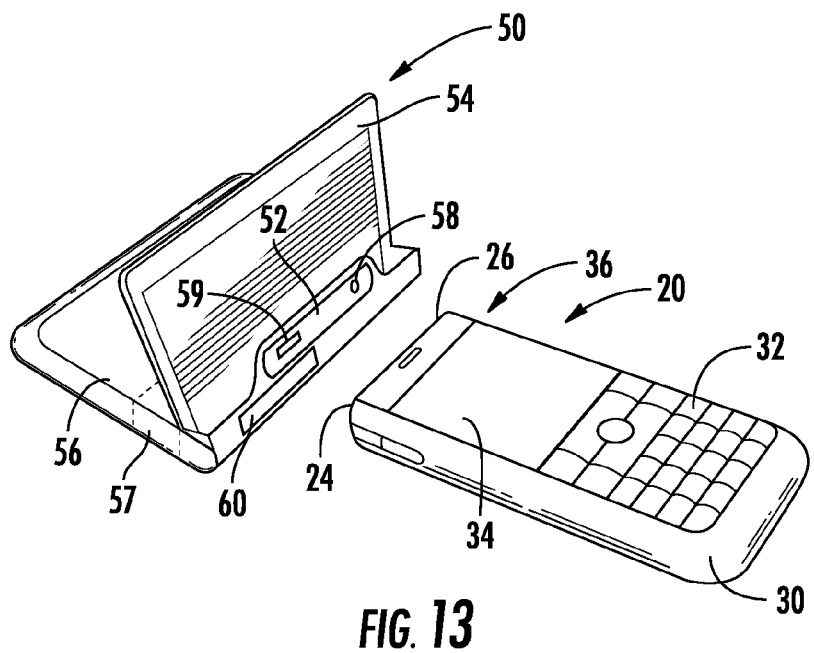
Figure 14:
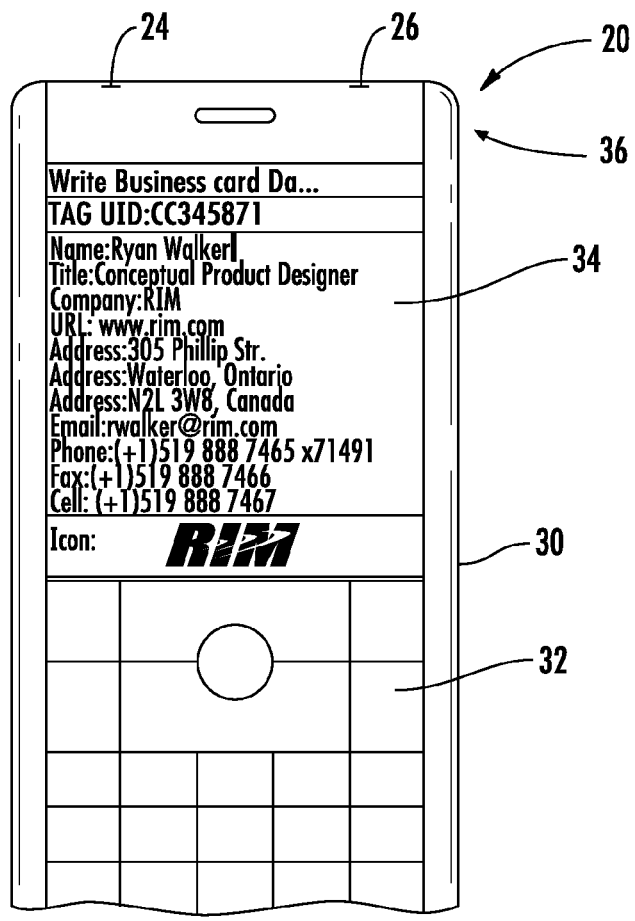
Figure 15:
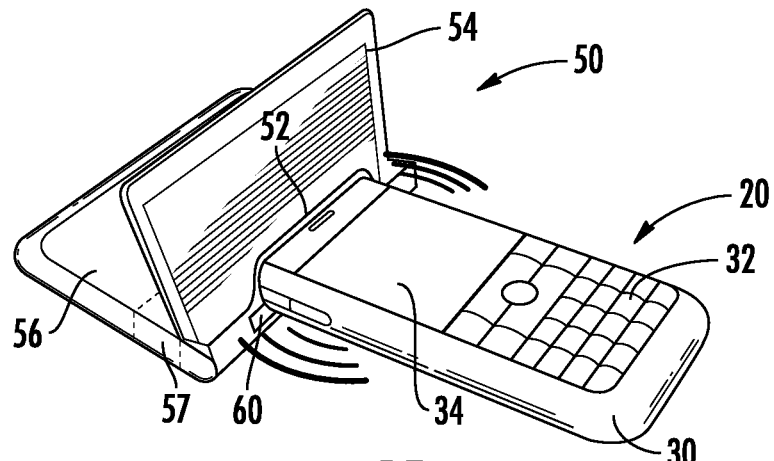
Figure 16:
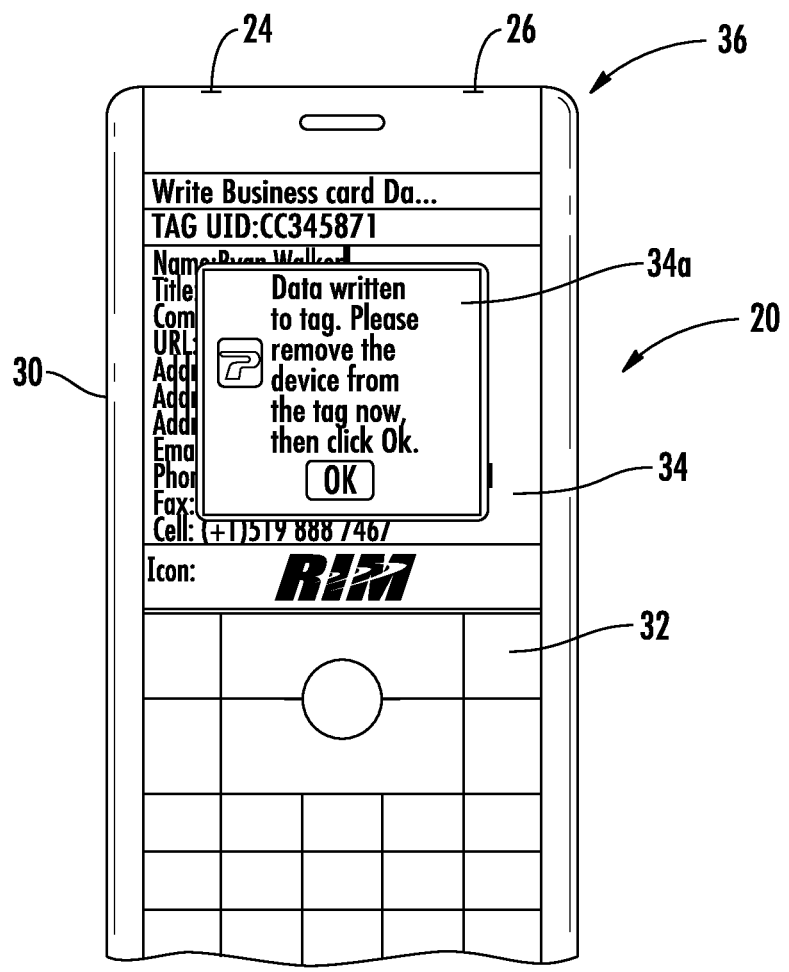
Figure 17:
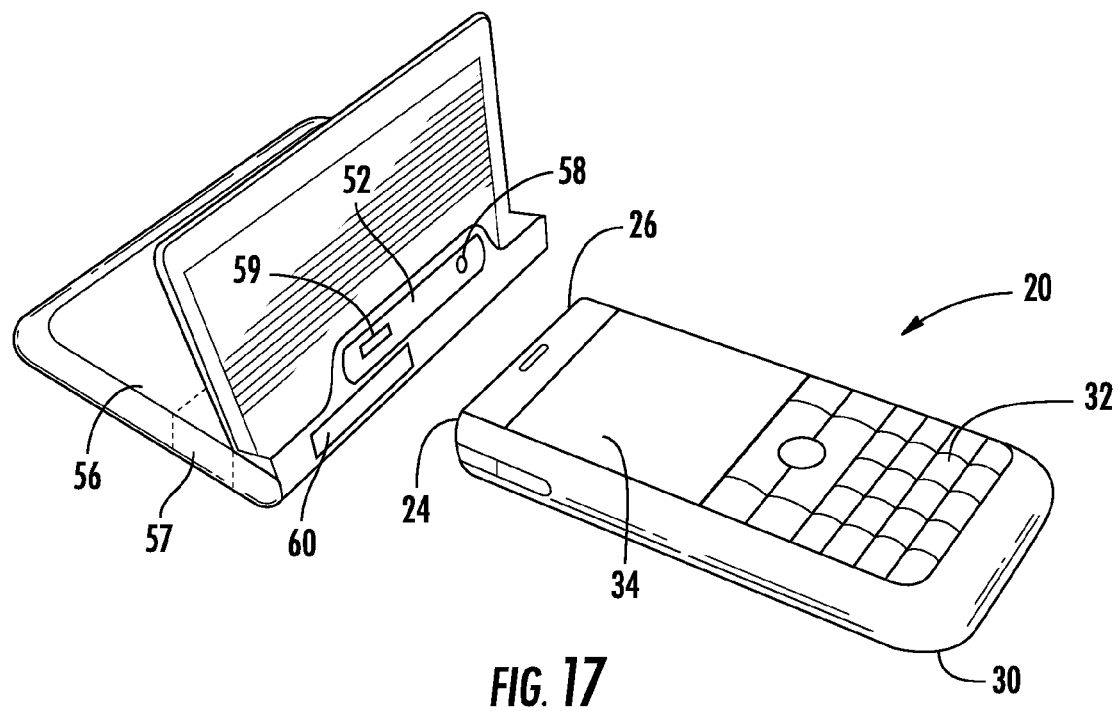
Figure 18:
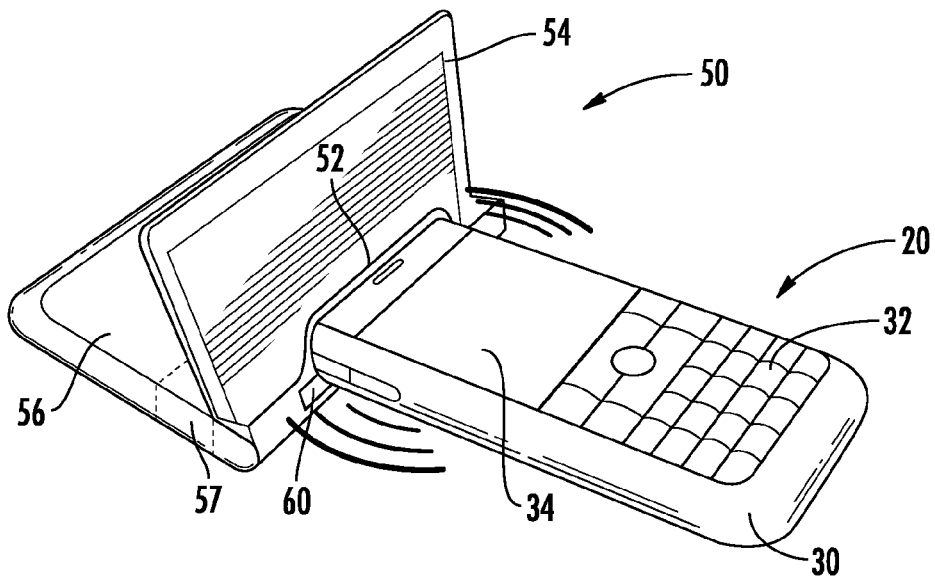
Figure 19:
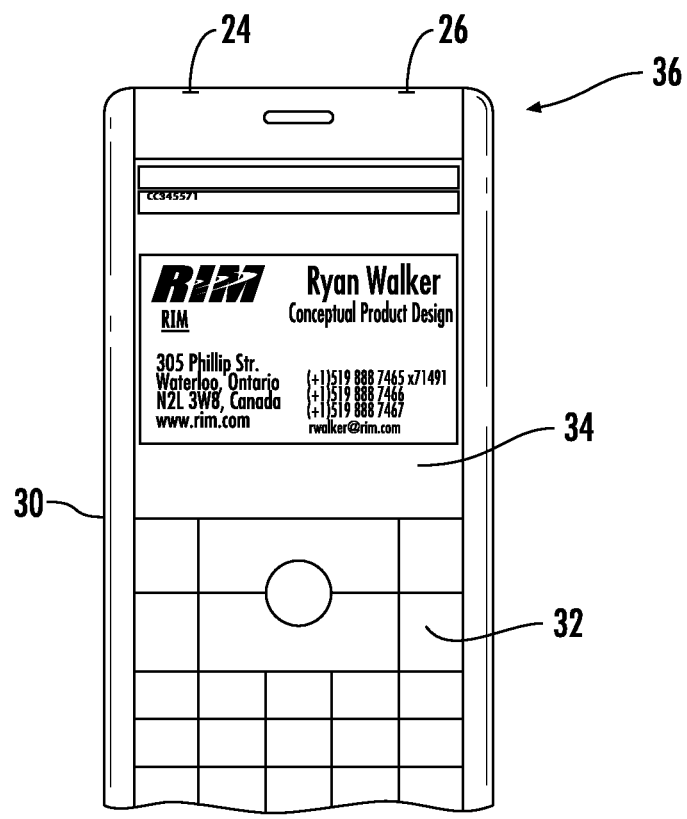

FIG. 12 shows the display 34 of the portable wireless communications device 20 in which a pop-up window 34a driven by the application states that the tag is empty and queries whether the user desires to program it. The portable wireless communications device 20 can be separated from the business cardholder 50 as shown in FIG. 13, and at that time, the device has prompted the user if they wish to program the business card data to the cardholder 50 such as shown by an example of the information (FIG. 14) displayed on the display 34 concerning the business card data to be written. The business cardholder 50 (also called NFC tag) is re-scanned by contacting the two devices together as illustrated and the data is written as shown in FIG. 15. In FIG. 16, the application displays on display 134 a pop-up screen 134a as an interface informing the user that the data is written to the business cardholder (as the NFC tag) and to remove the device from the business cardholder (NFC tag) and click "ok." As shown in FIG. 17 with a separation of the cardholder 50 and device 20, if the programmed business cardholder as a tag is now re-scanned (FIG. 18), the stored business card data is displayed as shown on the display 134 and depicted in FIG. 19.

A Bluetooth connection can be used as a non-limiting example if the cardholder were to include a Bluetooth communications module. The magnetic induction of the Hall Effect is still used to "wake up" another type of wireless connection such as for implementing the Near Field Communications between the device 20 and business cardholder 50 in FIGS. 9-19, as compared to implementing the Bluetooth communications in the example of the device-to-device 20,22 communications shown in FIGS. 1-7, in which the fixed magnet in one device is used to "wake up" the NFC circuit in the other device followed by data exchange for a communications protocol using Near Field Communications for establishing a Bluetooth connection. The NFC communications can be used to exchange any necessary data relating to a communications protocol, for example, exchanging any personal identification numbers (PIN) or security codes as may be necessary. It is also possible in some instances to use a Hall Effect switch to transmit a PIN for establishing Bluetooth communications without establishing a Near Field Communication. In most instances, however, the Hall Effect sensor 26 is used to sense ("see") the other device via the Hall Effect and after the devices contact each other or are in close proximity to each other (or "kiss" gesture) the NFC circuit is activated on one or both devices to read data on the other device. A wireless connection then can be established such as using Bluetooth based on the read data using the NFC communication. As a result a simple interface is established to initiate a wireless connection allowing a more simple and lower-powered method and system to be used than maintaining the NFC circuit or Bluetooth circuit constantly ON.

Magnetic induction can be used as the initial short-range communication to "wake up" a Near Field Communications circuit. Instead of a permanent magnet, an electromagnet can be used as an example 135 shown in FIG. 8 in the device 20 or other passive devices as explained in detail below. The use of such device could aid in establishing another communications approach.

It should be understood that once a wireless pairing is established such as described relative to FIGS. 1-7 with the Hall Effect sensor (using the "kiss" gesture), a functional interaction between the connected devices is initiated. A functional interaction in one example is determined based on any current applications that are running on one or both of the devices or any of the application services available by any one of the paired devices. For example, an address book exchange is suggested based on a device-to-device pairing when one device is in an Instant Messenger (IM) application to allow an exchange of addresses between the devices. In another example, the scheduling of a meeting is proposed in response to a device-to-device pairing when in a calendar application. In yet another example, a user is asked what to print in response to pairing with a printer device when the printer includes a NFC with stored data tag such as similar to the type described relative to the business cardholder of FIGS. 9-19. A limited amount of data is transmitted in this example.

There are some instances, however, in which a potential conflict exists, for example, if a first device as part of a device-to-device pairing was in the Instant Messenger application and the other device is in a calendar application. An issue arises whether an address book exchange occurs first or if a scheduled meeting should be proposed first. There are priority rules that are programmed into the devices. For example, the application software causes the Instant Messenger application to have priority followed by any calendar application, and thus, the address book exchange first occurs followed by a scheduled meeting proposal.

It is also possible for a device mode or application to be automatically selected based upon a wireless pairing. For example, if the portable wireless communications device 20 pairs with a computer running a presentation, the device may automatically enter a "remote control" mode. In another example, the user is presented with configuration options for a coffee maker, for example, in response to a pairing with a tag on the coffee maker having stored data and operable with a processor of the coffee maker. Other options include presenting the user with options to open a car door and start a car in response to pairing with the vehicle or automatically presenting a user with options to control and/or use a personal video recorder (PVR) in response to connection with a PVR that is an IP based connection over WiFi from a remote location. In each instance, of course, the device to be controlled includes an appropriate processor for responding to the device for control. The communications device 20, in one example, also acts as a passive accessory, for example, paying a subway toll when entering the subway or receiving a virtual receipt when checking items out at a store as explained below.

It is also possible to enter a device mode for relaying information about a source entered in response to pairing with a particular system. For example, data related to a retail store is offered when the user interacts with a tag or other device at a store. Ticket and movie information in one example is presented at a movie theater when a tag outside the theater is touched, or offers such as coupons are presented in certain locations when a tag is touched. Music, video or photographs are, in another example, presented or shared through the device in response to pairing with a stereo or television. In one example, initiation occurs via a user clicking on a notification, such as a notification for "show now" or perhaps the content is logged where the user chooses what images he or she wants to see. It is possible that the currently selected image is the one shown by default.

Information about the user's walk, in another example, is presented in response to pairing with a shoe that includes a pedometer, and storage space on the shoe is freed for further data. As noted before, in another example, PIN numbers and encryption keys are established and transmitted using Near Field Communication as a set-up communication for implementing a Bluetooth connection (or WiFi) as described before. In one example, a torrid is created that is split and a module driven through a Bluetooth chip and used as an Auto-BAHN signal with millimeter accuracy in positioning from GNSS. Some information is received back because of the control over a charging chip. A visual interface is available with the trigger to connect and establish an automatic pairing and connection as a "tactile action." It is also possible to have a magnet or an RFID module built-in such that both devices conduct a "transmit and receive."

In accordance with one embodiment, a magnetic sticker contains information or other data about intelligent systems such as data relating to an IP address, a printer name, Bluetooth Service Set Identifier (SSID) or security key. The Hall Effect, in one example, switches on communication between both devices, which accomplishes a "transmit and receive" to determine what connection each is trying to establish. The devices determine what protocol and technology each is using and negotiate and establish the desired connection. Logical rules or communication protocols are shared, for example, in a photograph application in which another device is touched and automatic downloading of photographs occurs.

In one example, magnetic tags operate as location stickers with stored data and are positioned throughout an office and each having different functions to be implemented in the device as explained in detail below. Such tags have been generally called RFC tags. These location stickers are similar to the magnetic tags and termed stickers because they are "stuck" at different locations, perhaps even by an adhesive or tape or other permanent or semi-permanent means. If an individual walks into a conference room, the individual touches their device to a tag and the portable wireless communications device profile can be switched into a "silent" mode perhaps for an hour depending on how the tag or location sticker is programmed. When a user's device enters an office, it is possible to touch the location sticker and obtain an instant messenger application interface or call forwarding from the device to a desk phone. Thus, some of the user interface applications that are typically performed manually are accomplished automatically in a single "gesture" by someone implementing the gesture and touching their device 20 to the sticker and the device is set. A user does not have to visually look at the screen, but performs the gesture and touches the location sticker or other magnetic tag with their device. Other applications using the "touch" gesture determine signal strength and adjust communications devices and implement cost control for communication.

Figure 20:
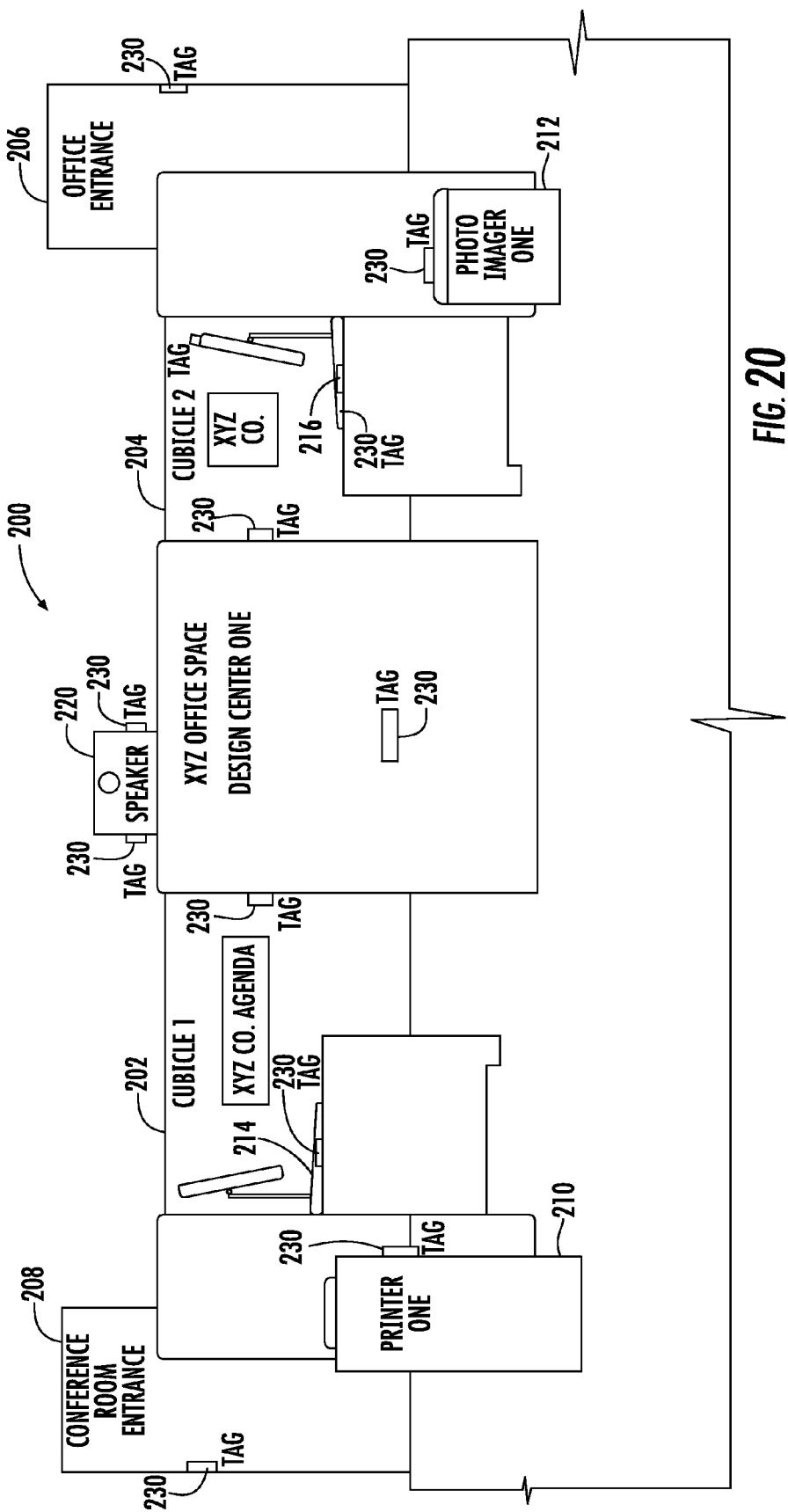
FIG. 20 is a fragmentary view of an office environment showing numerous passive tags located throughout the office.

FIG. 20 shows an office environment 200 in which various magnetic tags 230 or "stickers" as mentioned before are located at different areas. The office environment 200 includes two cubicles 202, 204 as illustrated, but it should be understood that many cubicles and offices are located in the office environment 200. An office entrance 206 is illustrated on one side and a conference room entrance 208 is illustrated on the other side. A printer 210 is located outside cubicle 1 and a photo imager 212 is located outside cubicle 2. Each cubicle includes a respective computer 214, 216. A speaker 220 is located on top of the cubicles. As illustrated, a tag is located at the office entrance 206 and the conference room entrance 208. A tag 230 is located on the printer. In one example, the tag is operative with the processing circuitry in the printer. A tag 230 is located on the photo imager 212. In one example, the tag is operative with the photo imager processing data. A tag 230 is also located at the cubicle wall between the cubicles 1 and 2. Tags 230 are located on the speaker 220. A tag 230 is located in each cubicle 202, 204 and also on each computer 214, 216 and operative with the processing circuitry. These tags have functionality relative to a communications device that includes the NFC circuit as explained before. For example, a user enters through the office entrance 206 and certain functions are activated in their communications device.

For example, it is possible that the phone enters a "silent" mode since the user will be in their cubicle and there is no need for the communications device to enter a ringing mode. The same occurs if someone enters the conference room and touches the tag 230 at the conference room entrance with their device. Also, if someone who does not use the cubicles touches the tag 230 located at the cubicle space between the two cubicles, then it gives a location and what type of office they are walking through such as the Design Center as illustrated and printed on the cubicle wall. The speaker 220 is illustrated, in one example, and a user touches the tag 230 with their communications device and downloads or uploads music to cause music to be played in the speaker. The tags 230 in each of the cubicles are touched to activate a calendar program, for example. If the tag 230 at a computer is touched, then the computer, in one example, is operated and starts running a presentation or the device automatically enters a "remote control" mode for controlling the computer through the communications device, such as using Bluetooth or WiFi.

It is possible by touching the tag 230 in a cubicle that the user is presented with configuration options, for example, for operating a coffee maker at their desk in response to pairing with the coffee maker. If the tag 230 at the printer 210 is touched, then the printer 210, in an example, is instructed to print a certain document such as by causing a Bluetooth or WiFi connection between the device and printer. If the photo imager tag 230 is touched, the photo imager 212 could receive photos from the communications device and begin printing photographs. These are only non-limiting examples of how the tags 230 are used to establish functions, such as activating the NFC circuit, and exchanging protocol information or other data and causing the device to enter a Bluetooth, WiFi, silent or other device function.

It should be understood in one example that the shape on the device and the shape of the sticker or tag 230 are configured similarly and the magnet touched in an appropriate location to facilitate functionality. Other functions are possible such as an address book exchange based on device-to-device pairing when one device is in the instant manager application. The scheduling of a meeting in another example is proposed in response to a device-to-device pairing when in the calendar application or when entering the conference room. Meeting schedules and calendar applications are brought up automatically to discuss at a meeting. Other possibilities include the user with options to open a car door and start a car in response to pairing with a vehicle if a tag is located on a vehicle, or automatically present the user with options to control and/or use a personal video recorder (PVR) in response to connection with a personal video recorder. This is an IP based connection over WiFi from a remote location in one example. The device, in another example, also acts as a passive accessory such as paying a subway toll when entering the subway or receiving a virtual receipt when checking out at a store.

The location mode, in one example, applies to the office environment in FIG. 20. When a user passes through the cubicle area and touches the tag 230 on the space between cubicles 1 and 2, this NFC enabled tag gives a location and the type of office. Thus, the system and device triggers an action when a user is "detected" as being in proximity to a location of contextual importance. For example, a user who has been detected may already be in the correct location for a meeting, which may be in that user's corporate calendar application. The user does not receive a warning indicator, since they know they are already supposed to be in the meeting. There may be some "implicit" detectability by a user noticing improved usability/behaviors of the mobile device. This overcomes the disadvantages when wireless devices typically behave in the same manner regardless of context or geographical location. For example, a calendar event such as a meeting reminder may be triggered even though the user is already physically in the meeting.

Common devices in an office, such as a telephone or computer, are tagged as shown in FIG. 20 or otherwise identified on the device so that the device "knows" when the user is in the office. This could be used to change the behavior of the device or other devices in the office. For example, if the user's device has a 9:00 a.m. calendar item "meet with colleague" and the meeting is in the user's office or cubicle, then the user's device may communicate with the user's desk phone to turn off the ringer during the meeting. The device could also be pre-tagged to activate other devices such as a punch clock when the user is nearby. Wireless protocol such as Bluetooth or WiFi may be used. Geographical and proximity signals such as GPS, magnetic location and similar functions, may be used to provide the device with data relating to the location of the user.

Figure 21:
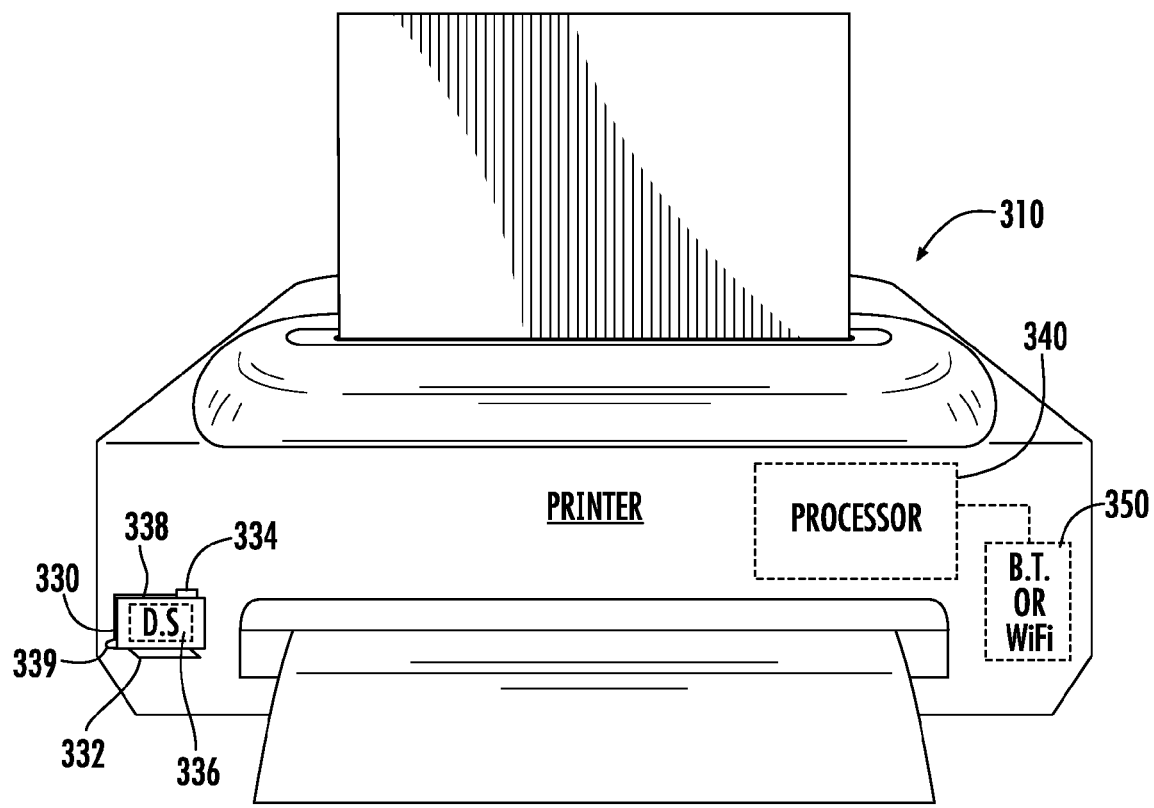
FIG. 21 is a front elevation view of a printer showing a passive tag connected thereto.

FIG. 21 illustrates a printer 310 such as used in the office environment of FIG. 20. The printer includes a passive magnetic tag 330 of the type described before. The tag can be stuck on the printer by various techniques. It includes basic tag functions such as described relative to the business card holder in FIGS. 9-19 in terms of activating the NFC circuit in the device. The printer 310 includes a processor 340 and a Bluetooth or WiFi communications module 350. In this particular example, the user in cubicle 1 or cubicle 2 can take their communications device 20 such as shown in FIG. 1 and touch the magnetic tag 330. This enables the NFC circuit and the NFC communications protocol established to negotiate and activate a Bluetooth or WiFi connection in connection with the Bluetooth or WiFi module 350. The communications device downloads data to the printer processor 340, allowing a page to be printed. Alternatively, the tag 330 is connected to the processor and has stored data that is sent to the processor for printing or receives data from the communications device for transfer to the printer. In another example, this tag 330 is programmable as a passive tag with information transferred from the communications device 20. This tag 330 also, as noted before in one example, has an identifier such as an IP address. When the user leaves the office space and returns and touches the tag again, the communications device automatically knows the IP address and is configured to work with that printer 310.

The tag is also referred to as a magnetic tag and a sticker and includes a mounting member 332 as illustrated. This mounting member 332 could be an adhesive tape, a Velcro attachment or other adhesive or magnetic attachment (if the supporting surface is metallic). There are Type 1, Type 2, Type 3 and Type 4 tags with functionality that in different examples are implemented. Some tags are read-only as used and others are read/write. In certain examples, some of the tags are single-state and are read-only. Tags have memory capacity in some examples of 96 bytes plus 6-byte OTP plus 2 bytes metal ROM. Others are 48 bytes and some are 1 Kbyte and others variable. Other examples of tags are lockable to read-only and some include security for a 16 or 32-byte digital signature in another example. A magnet 334 is illustrated and configured to activate the NFC circuit in a communications device when placed in the "kiss" configuration with each other. The data store 336 is illustrated. The housing 338 supports the magnet 334 and carries the magnet. The magnet is configured to be magnetically sensed by a magnetic sensor carried by the communications device to activate the NFC circuit within the communications device and communicate using an NFC communications protocol. The data store 336 stores data regarding a function of the communications device to be magnetically coupled by the magnet. The data store is configured to be read by the communications device using an NFC communications protocol after the NFC circuit had been activated. The tag is mounted within the workspace to interact based on instructions stored within the data store regarding the function of the communications device. The data store 336 could be formed as ROM or other storage as known and engage with other circuitry or other programmable devices in some examples. The magnet can be positioned and configured at different locations to engage the magnetic sensor on a communications device and operate to activate the NFC circuit in the communications device such that data in the data store can be read and used by the communications device.

The tag or sticker, in one example, is formed as a shape that is recognizable by the communications device. For example, the tag is formed as a geometric shape with the magnet configured or positioned at a predetermined location on the tag or sticker based on the geometric shape. The communications device has its magnetic sensor oriented such that the magnet on the tag or sticker aligns with the magnetic sensor on the communications device. The tag or sticker is configured such that the communications device is positioned against the tag or sticker in a certain orientation to enable the NFC circuit. In another example, reference marks are included on both the tag or sticker and the communications device such that the communications device is aligned with the tag or sticker using the reference marks in order to enable the NFC circuit. In FIG. 21, a reference mark is shown at reference 339. In this example, the reference mark 339 is formed as a small protrusion.

Figure 22:
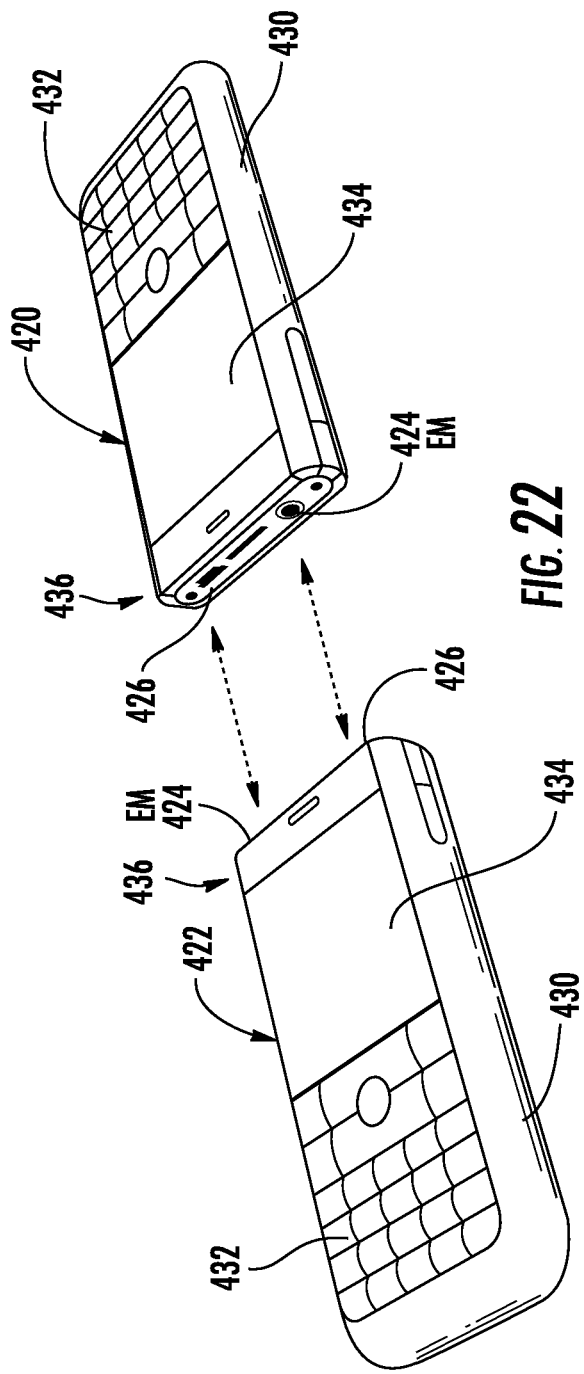
FIG. 22 shows two communications devices that use an electromagnet in a kiss gesture.

FIG. 22 illustrates another embodiment and showing communication devices 420, 430 that use a magnetic sensor 426, such as a Hall Effect sensor, and operate in conjunction with an electromagnet 424 instead of a permanent magnet. Other details are illustrated such as the housing 430, keyboard 432, and display 434. The electromagnet 424 and sensor 426 are located at the top 436 of the devices in this example. The electromagnet that is used is illustrated, for example, in FIG. 8 as the electromagnet shown at reference numeral 135. This electromagnet 424 transmits pulses of energy as communication signals. This limited data can be enough communications data to the other device to receive through its sensor 426, such as the Hall Effect sensor, and activate a Bluetooth connection, thus not requiring activation of any NFC circuit. A spacing should be made sufficient between the sensor, such as the Hall Effect sensor, and the electromagnet 424 in one device because the energy from the electromagnet could be received inadvertently by the sensor 426 on the same device 420 instead of the other device 422. The amount of energy used by the electromagnets is sufficient to allow pulses to be transmitted to the sensor 426 in a kiss gesture, but not enough energy to activate the sensor on the same device on which this electromagnet is positioned. The spacing and distance, naturally, depends on the amount of energy in the pulses that are transmitted from the electromagnet.

Figure 23:
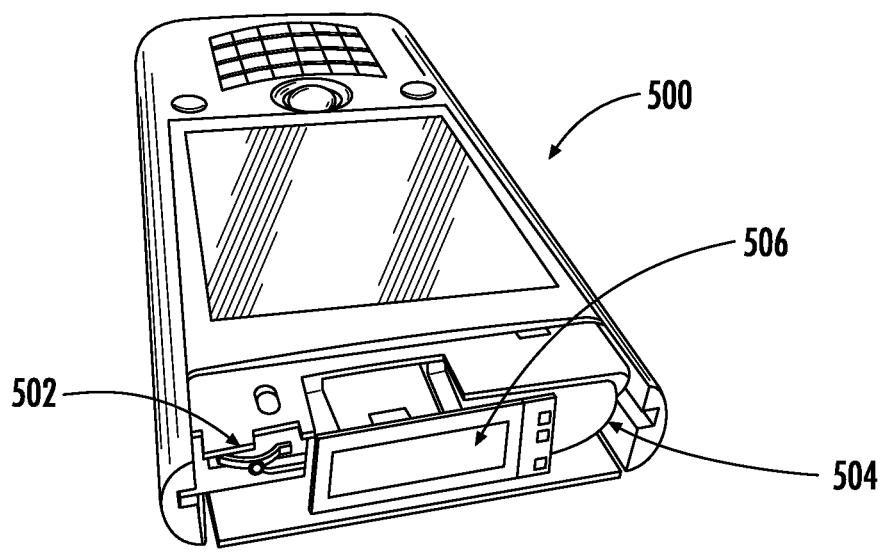
FIG. 23 is a perspective view of a communications device looking at the top with the top end cap removed and showing the magnet, magnetic sensor and antenna positioned at the top.

FIG. 23 is a perspective view of a communications device 500 and showing a top end cap removed and the magnetic sensor 502, magnet 504 and a mini Near Field Communications (NFC) antenna 508 mounted at the top of the device. A hall integrated circuit (IC) is located at this top section (not shown). The NFC controller integrated circuit (IC) is also in this general area (not shown). It is possible to form these different components to be replaced as one unit. An end cap covers the top of the communications device and can be removed and the components removed as one circuit unit to facilitate replacement.

Figure 24:
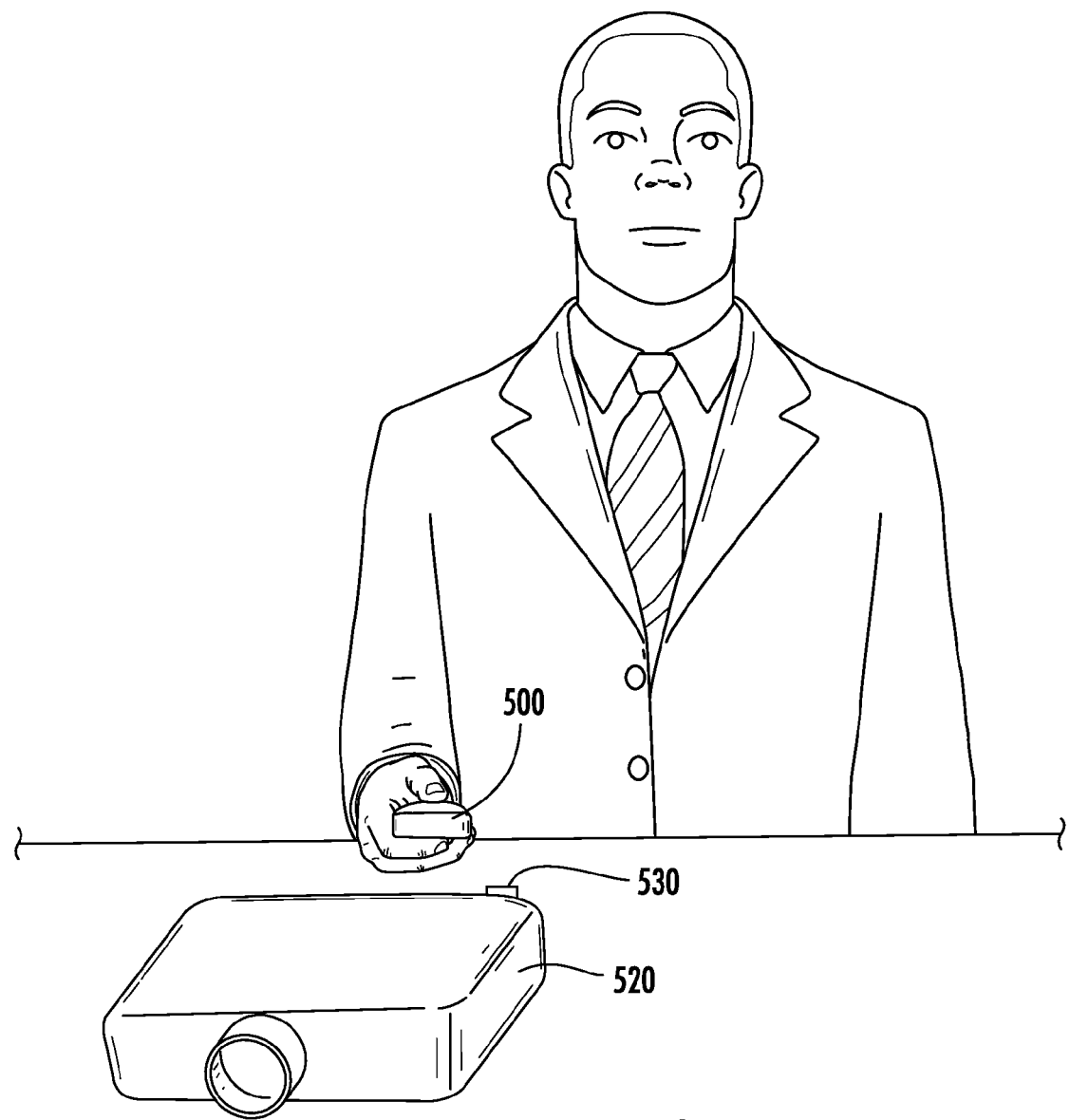
FIG. 24 is a fragmentary perspective view showing connection between the communications device and a projector using a tag located on the projector to implement the connection.

FIG. 24 shows a communications device 500 seamlessly connected with a projector 520 or other peripheral as a user travels, giving presentations from the device 500 to research partners, conferences and executive meetings. A tag 530 as described before is installed on pre-existing hardware, such as a projector as illustrated, and simplifies the connection between a personal computer and projector or gives direction to the communications device. The tag 530 is located near the rear of the projector in this example. In one example, accessories such as headsets are pre-installed with identification tags allowing Bluetooth pairing using the kiss gesture with the device. The tags in another example are installed on printers such as described herein above and store the network path providing relevant data necessary for printing from the communications device through an available WiFi network. In the illustration of FIG. 24, the user scans the projector tag 530 mid-conversation, never having to devote his attention to launching the Near Field Communications from the communications device.

Similar examples are accomplished with a tag 530 embedded in a car stereo at the manufacturer or a third party Bluetooth car kit that is a tag with pre-programmed conductivity data. A tag is added to an existing Bluetooth stereo and writes the conductivity data to the tag using the communications device 500 in a kiss gesture. For example, in the speaker 220 (FIG. 20), it is possible to write conductivity data to its tag using the communications device. This gives a user control over connecting and disconnecting to a car system. In some cases, automatic conductivity is not desired. The Bluetooth does not have to be active on the communications device. The act of scanning the tag in a kiss gesture launches the Bluetooth and establishes the connection. The kiss tag, in one example, is scanned to change user profiles, connect a media player through the stereo speakers, and achieve active hands-free phone functionality.

Figure 25:
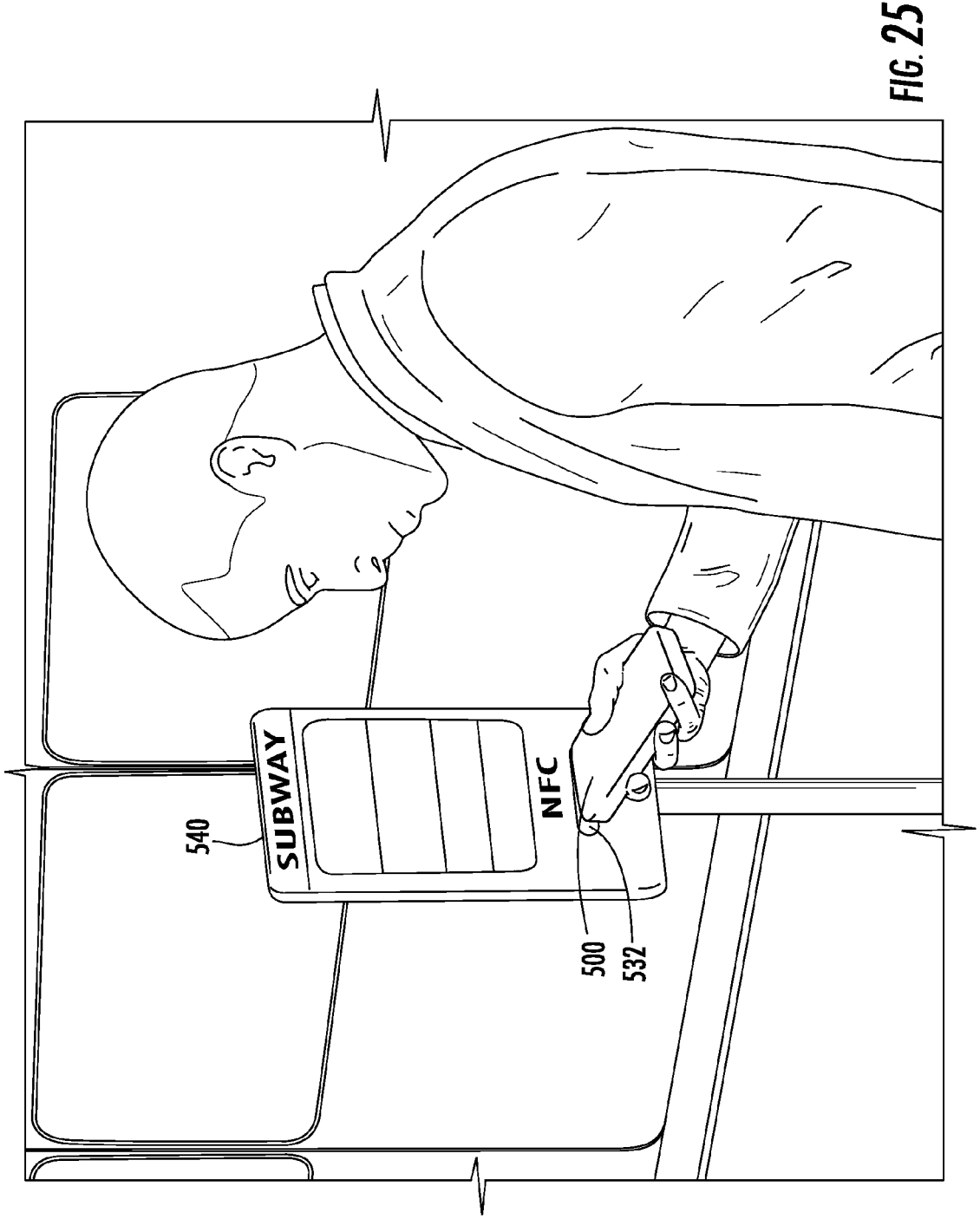
FIG. 25 is a fragmentary perspective view showing a tag attached at a subway terminal to link a user to schedules through a connection with the communications device.

FIG. 25 shows a communications device 500 connected initially with the kiss gesture to the tag 532 at a subway station where the tag 532 is attached to a subway terminal 540 to link the user to scheduled arrival and departure time information. The tag, in another example, is used at bus terminals. Where no data plan is required, entire schedules are stored on the tag's on-board memory. It is possible to grab updated train schedules with a single gesture as a user walks through a busy subway. This is similar to the advantage in which action is performed without looking at the device and there is no requirement to look through software menus to activate NFC when driving down the road in the automobile example described above.

Figure 26:
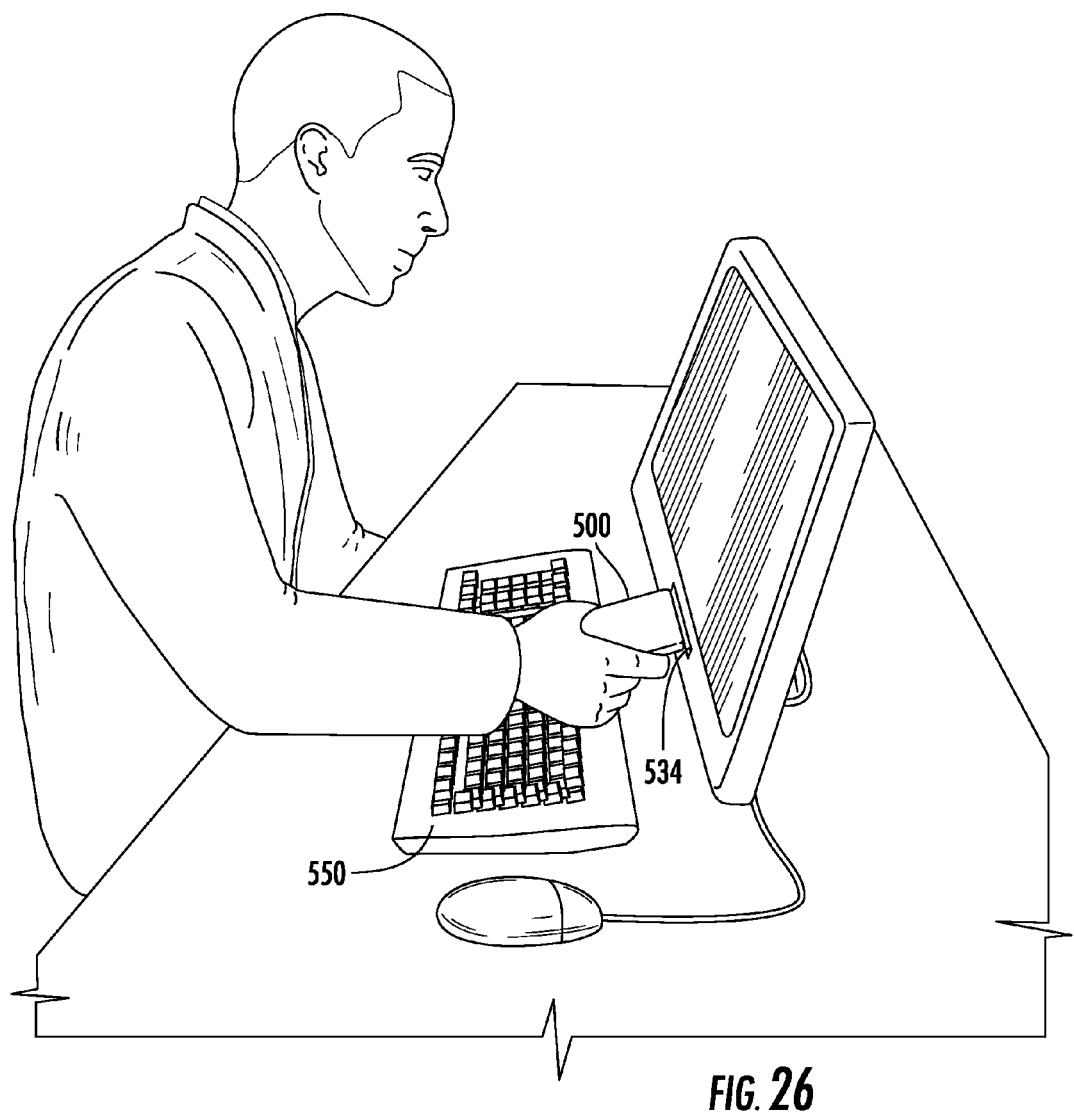
FIG. 26 is a fragmentary perspective view of a communications device connected to a computer by implementing the connection using a tag.

FIG. 26 shows a communications device 500 connected in communication to a personal computer 550 in which the user automatically adjusts his communications device to separate his professional life from his personal life and leisure activities. Other examples abound. The tags 534 are installed at work or in the office and are quickly scanned to notify the communications device 500 that a user has entered the work environment. Ringer profiles are automatically switched and calendar events changed. Arriving at home, tags are installed at the entrance or as part of a docking bay to let the communications device 500 know that the user is back at home and adjusts settings accordingly. The calendar events for home and leisure activities take priority leaving work back at the office. Additionally, a tag in one example is placed in a car and automatically initiates Bluetooth conductivity with the stereo and enters a hands-free driving mode. Again, the kiss gesture with the communications device 500 eliminates the requirement to sift through menus every time the user moves, making location awareness and convenience not a hassle.

Figure 27:
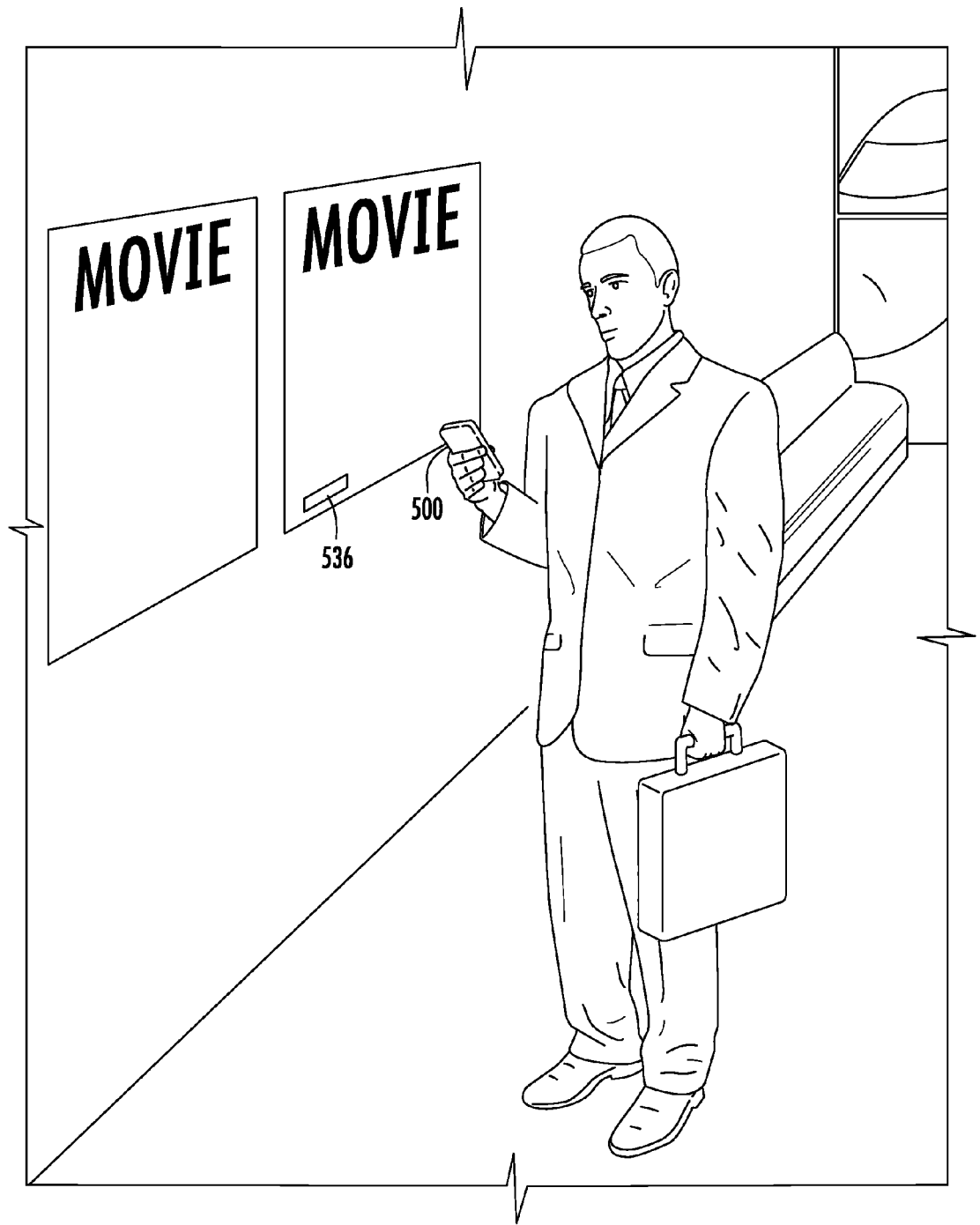
FIG. 27 is a fragmentary perspective view showing a communications device connected to access media as a media alternative with connection established using a tag.

FIG. 27 shows a media centric alternative in which a user has Bluetooth pairing and groups to access media. For example, a father uses his or his son's communications device 500 and engages in multi-player gaming via a communications connection. It is possible to stay up-to-date with popular culture and media by scanning a tag 536 on an upcoming movie poster while waiting at an airport. The device 500 instantly launches into a website providing show times, reviews, and local ticket sales. Tickets are ordered directly from the device to share the event with the son via other groups. Thus, a user seamlessly grabs data.

Figure 28:
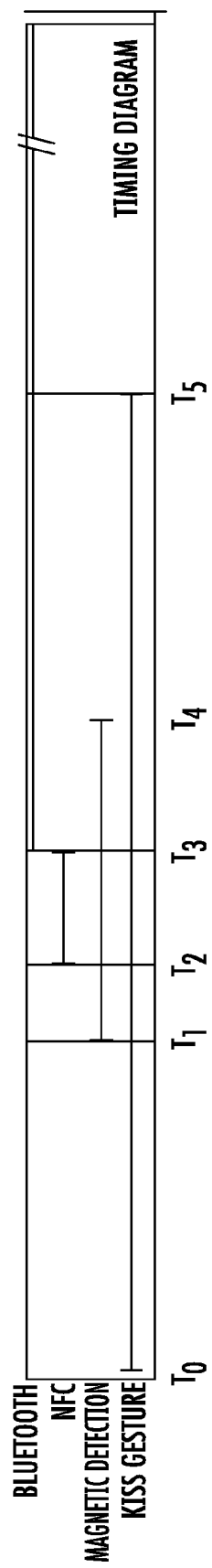
FIG. 28 is a timing diagram showing time for the kiss gesture, magnetic detection, NFC and Bluetooth.

FIG. 28 shows a timing diagram with relative time with time as T0, T1, T2, T3, T4 and T5 for activities that occur during the kiss gesture followed by activating NFC and magnetic detection and Bluetooth. The Bluetooth connection has no ending shown because it will end when the communications session ends.

Figure 29:
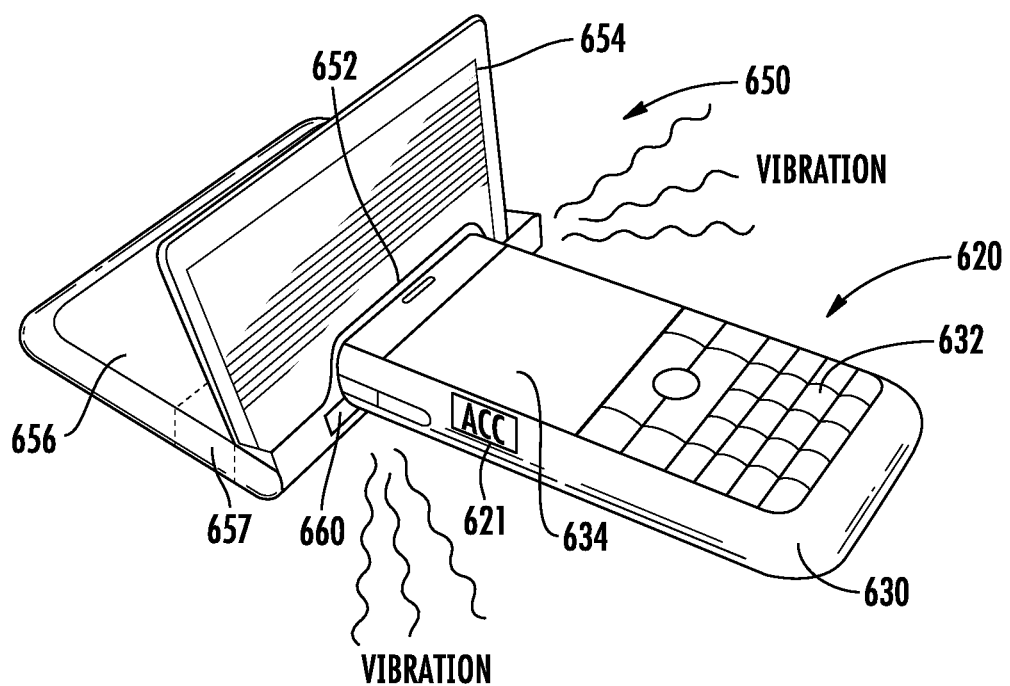
FIG. 29 is an example of a communications device that uses an accelerometer to initiate NFC communications.

FIG. 29 illustrates another embodiment showing a communications device 620 that transfers contact information such as with a compatible business cardholder 650 and can operate as a passive device, in this example, similar to a passive magnetic tag (or passive NFC tag) as described before. It can operate actively also as described. Instead of using magnetic detection as illustrated in the embodiment relative to FIGS. 9-19, however, an accelerometer 621 as a vibration sensor is used such as the type explained with regard to the accelerometer 137 in FIG. 8. The business cardholder 650 as illustrated includes an interface 652 for contacting the device 620 at the rear and a hinged cover 654 and data entry point 656 where business cards can be scanned or information entered on a keypad as non-limiting examples. A processor circuit 657 provides general functions for operation of the business cardholder and its associated function, for example, NFC circuits, scan circuits or keyboards. An NFC tag 660 of the type as explained before is included. The communications device 620 includes similar components as explained relative to previous figures such as the housing 630, keypad 632, and display 634.

The accelerometer 621 implements NFC automatic tag detection (and automatic peer-to-peer detection). The accelerometer 621 recognizes the tapping of a device against the tag 660 of the cardholder 650 or similar passive device, i.e., recognizes the vibrations. Instead of using the Hall effect sensors and magnets to wake up the NFC circuit, the circuit uses tap recognition as a vibration sensor and accelerometer in this example. It should be understood that when the device is tapped against another object, for example, the NFC tag 660, a profile is generated as a matter of certain accelerometer parameters being met or exceeded. If the profile is compared against a known tap profile, it will wake the NFC circuit and initiate communication.

As noted before, the communications device 620 includes the accelerometer 621. The accelerometer 621 could be formed as a sensor based upon piezoelectric elements. The accelerometer 621 in one example includes a microelectomechanical system (MEMS), such as a capacitive accelerometer. Other accelerometers, including piezoelectric, piezoresistive and gas-based accelerometers, are used. By way of example, in one embodiment the accelerometer is a LIS3L02AQ tri-axis analog accelerometer from STMicroelectronics of Geneva, Switzerland. In some embodiments, a single integrated device is used, for example the LIS3L02DQ tri-axis accelerometer with I2C or SPI interface from STMicroelectronics. The selection of an appropriate accelerometer as a vibration sensor, in one example, is based upon the frequency response range and the sensitivity response of the communications device during tapping.

A dual axis accelerometer is used in one example and outputs an x-axis signal and a y-axis signal. A tri-axis device, in one example, outputs signals for orthogonal x-, y-, and z-axes. The output signals are analog voltages proportional to accelerative force in the axis direction. For example, at least one tri-axis accelerometer outputs a voltage that corresponds to a range of positive and negative linear accelerations of 1.7 g. The accelerometer in an example embodiment includes various filters, signal conditioners, etc., for conditioning the output signals.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device, comprising:
    a housing;
    radio frequency (RF) circuitry comprising Bluetooth circuitry and a data and voice RF circuit that establishes communications over a public data and voice communications network, and a processor carried by the housing;
    a data store that stores instructions and data for an address book application and calendar application and priority rules that give priority between applications and address and contact information for contacting an individual over the public data and voice communications network;
    a Near Field Communications (NFC) circuit connected to the processor for communicating using an NFC communications protocol; and
    a magnetic sensor supported by the housing and connected to the processor and configured to sense a magnet of another mobile wireless communications device when the magnetic sensor is aligned with the magnet located on the other mobile wireless communications device and generate a signal to the processor, the magnetic sensor requiring a closer contact to sense the magnet of the other mobile wireless communications device than for the NFC circuit to communicate using the NFC communications protocol; and
    wherein the processor is configured to switch on the NFC circuit and activate the NFC circuit to transmit or receive Bluetooth configuration data to or from the other mobile wireless communications device using the NFC communications protocol in response to the signal, wherein the communications protocol data is related to establishing a Bluetooth communications connection between the mobile wireless communications devices, and the NFC circuit is in a lower power state when not switched on, the Bluetooth circuitry being activated after the NFC circuit receives Bluetooth configuration data related to the Bluetooth communications connection, wherein contact data for an individual to be contacted via the public data and voice communications network is received from the other mobile wireless communications device if the priority rules permit such transfer using Bluetooth communications and stored within the data store and said data and voice circuit is user actuated via the address book application to retrieve the contact data and establish voice and data communications with the individual to be contacted.

2. The mobile wireless communications device according to claim 1, wherein said housing includes a top.

3. The mobile wireless communications device according to claim 2, wherein the magnetic sensor is positioned at the top of the housing.

4. The mobile wireless communications device according to claim 1, wherein the magnetic sensor comprises a Hall Effect sensor.

5. The mobile wireless communications device according to claim 4, wherein said processor receives signals indicative of voltage variations within the Hall Effect sensor and based on the voltage variations activates the NFC circuit.

6. The mobile wireless communications device according to claim 4, wherein said Hall Effect sensor is operative in adjacent, non-contact relation to a magnet.

7. The mobile wireless communications device according to claim 1, wherein said RF circuitry further comprises WiFi circuitry for establishing a WiFi wireless communications connection.

8. The mobile wireless communications device according to claim 1, wherein said processor is configured to make a scheduled meeting in a calendar application.

9. A method for establishing wireless communications between communications devices, the method comprising:
providing first and second mobile wireless communications devices each comprising a housing and a processor and radio frequency (RF) circuitry comprising Bluetooth circuitry and a data and voice RF circuit that establishes communications over a public data and voice communications network and carried by the housing, each device further comprising a magnet and magnetic sensor carried by the housing, said magnetic sensor connected to the processor, and a Near Field Communications (NFC) circuit connected to the processor;
providing a data store that stores instructions and data for an address book application and calendar application and priority rules that give priority between applications and address and contact information for contacting an individual over the public data and voice communications network;
aligning respective magnets and magnetic sensors such that a magnet on the first mobile wireless communications device is aligned with a magnetic sensor on the second mobile wireless communications device and a magnet on the second mobile wireless communications device is aligned with a magnetic sensor on the first mobile wireless communications device, a magnetic sensor requiring a closer contact to sense the magnet on a respective mobile wireless communications device than for the NFC circuit to communicate using the NFC communications protocol;
generating a signal to the processor from a magnetic sensor after sensing an aligned magnet and switching on and activating the NFC circuit contained in at least one mobile wireless communications device;
exchanging Bluetooth configuration data between the first and second mobile wireless communications devices using an NFC communications protocol in response to the signal, wherein the NFC circuit is in a lower power state when not switched on and the Bluetooth configuration data is communicated between the mobile wireless communications devices; and
establishing a communications connection between the first and second mobile wireless communications devices based on the Bluetooth configuration data exchanged between the first and second communications devices using the Bluetooth circuitry within each mobile wireless communications device, wherein contact data for an individual to be contacted via the public data and voice communications network is received from the other mobile wireless communications device if the priority rules permit such transfer using Bluetooth communications and stored within the data store and said data and voice circuit is actuated via the address book application to retrieve the contact data and establish voice and data communications with the individual to be contacted.

10. The method according to claim 9, further comprising using a Hall Effect sensor located within the first communications device to sense the magnet located on the second communications device.

11. The method according to claim 10, further comprising sensing voltage variations from the Hall Effect sensor within the processor of the respective mobile wireless communications device and signaling the NFC circuit from the processor for activating the NFC circuit.

12. The method according to claim 9, further comprising positioning the magnet and magnetic sensor of the first communications device on the housing adjacent to each other.

13. The method according to claim 9, further comprising switching on and activating the NFC circuit within respective mobile wireless communications devices when the devices are in physical contact.

14. The method according to claim 9, further comprising switching on and activating the NFC circuits within respective mobile wireless communications devices when the devices are adjacent to each other.

15. The method according to claim 9, further comprising exchanging a personal identification number (PIN) and security key between the first and second mobile wireless communications devices using NFC for establishing the Bluetooth communications connection.

16. The method according to claim 15, further comprising establishing a WiFi communications protocol.

17. The method according to claim 9, further comprising making a scheduled meeting in a calendar application.

18. A system for communicating, comprising:
first and second mobile wireless communications devices each having a housing and radio frequency circuitry comprising Bluetooth circuitry and a data and voice RF circuit that establishes communications over a public data and voice communications network, a processor, a data store that stores instructions and data for an address book application and calendar application and priority rules that give priority between applications and address and contact information for contacting an individual over the public data and voice communications network, and a Near Field Communications (NFC) circuit connected to the processor for communicating using an NFC communications protocol and a magnet and a magnetic sensor connected to the processor for sensing a magnetic field and generating a signal to the processor, wherein the magnetic sensors require a closer contact to sense the respective magnets of the other respective mobile wireless communications device than for the NFC circuit to communicate using the NFC communications protocol, and in response to the signal, the processor is configured to switch on and activate the NFC circuit for transmitting or receiving Bluetooth configuration data using the NFC communications protocol in response to the signal, wherein the NFC circuit is in a lower power state when not switched on, and the Bluetooth configuration data is communicated between the mobile wireless communications devices and a Bluetooth communications connection is established between the first and second mobile wireless communications devices based on the Bluetooth configuration data exchanged between the first and second communications devices using Bluetooth circuitry within each mobile wireless communications device; and wherein contact data for an individual to be contacted via the public data and voice communications network is received from the other mobile wireless communications device if the priority rules permit such transfer using Bluetooth communications and stored within the data store and said data and voice circuit is actuated via the address book application to retrieve the contact data and establish voice and data communications with the individual to be contacted.

* * * * *